United States Patent
Chin et al.

(10) Patent No.: US 11,626,918 B2
(45) Date of Patent: Apr. 11, 2023

(54) METHOD OF PERFORMING BEAM FAILURE RECOVERY AND RELATED DEVICE

(71) Applicant: FG Innovation Company Limited, Tuen Mun (HK)

(72) Inventors: Heng-Li Chin, Taipei (TW); Hsin-Hsi Tsai, Taipei (TW); Hung-Chen Chen, Taipei (TW); Chia-Hung Wei, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/936,296

(22) Filed: Jul. 22, 2020

(65) Prior Publication Data

US 2021/0028849 A1    Jan. 28, 2021

Related U.S. Application Data

(60) Provisional application No. 62/877,261, filed on Jul. 22, 2019.

(51) Int. Cl.
*H04B 7/06* (2006.01)
*H04W 72/12* (2009.01)
(Continued)

(52) U.S. Cl.
CPC ......... *H04B 7/0695* (2013.01); *H04B 7/0617* (2013.01); *H04B 7/088* (2013.01); *H04W 72/1268* (2013.01)

(58) Field of Classification Search
CPC .... H04B 7/0695; H04B 7/0617; H04B 7/088; H04W 72/1268; H04W 52/0216; H04W 52/028; Y02D 30/70
See application file for complete search history.

(56) References Cited

U.S. PATENT DOCUMENTS 11,025,331 B2 *  6/2021  Cirik .................. H04W 76/11
2019/0349061 A1 * 11/2019  Cirik .................. H04L 1/1858
(Continued)

FOREIGN PATENT DOCUMENTS

CN     109246732 A    1/2019
CN     109391405 A    2/2019
(Continued)

OTHER PUBLICATIONS

Ericsson Potential use cases of enhancing radio link failure report in NR 3GPP TSG-RAN WG3 #106 Tdoc R2-1906892 May 17, 2019(May 17, 2019) part2.
3GPP TS 38.213, "3rd Generation Partnership Project; Technical Specification Group Radio Access Network; NR; Physical layer procedures for control (Release 15)", Technical Specification, V15. 4.0, (Dec. 2018).
(Continued)

*Primary Examiner* — Habte Mered
(74) *Attorney, Agent, or Firm* — ScienBiziP, P.C.

(57) ABSTRACT

A method for a user equipment (UE) performing a beam failure recovery (BFR) procedure is disclosed. The method comprises performing a first beam failure detection (BFD) procedure on a first cell, performing a second BFD procedure on a second cell, triggering a first BFR procedure for a first cell in response to a beam failure being detected on the first cell by the first BFD procedure, triggering a second BFR procedure for a second cell in response to a beam failure being detected on the second cell by the second BFD procedure, and canceling the triggered first BFR procedure for the first cell in response to a BFR report corresponding to at least one of the first and second BFR procedures being successfully transmitted to a base station (BS), wherein the BFR report includes BFR information of the first cell.

20 Claims, 5 Drawing Sheets

(51) Int. Cl.
  *H04B 7/08* (2006.01)
  *H04W 72/1268* (2023.01)

(56) References Cited

U.S. PATENT DOCUMENTS

| | | | | |
|---|---|---|---|---|
| 2020/0137821 | A1* | 4/2020 | Cirik | H04B 7/063 |
| 2020/0260300 | A1* | 8/2020 | Cirik | H04W 24/08 |
| 2020/0314722 | A1* | 10/2020 | Kyung | H04W 74/0833 |
| 2020/0350973 | A1* | 11/2020 | Cirik | H04B 7/0695 |
| 2021/0013948 | A1* | 1/2021 | Agiwal | H04W 80/02 |
| 2021/0013949 | A1* | 1/2021 | Agiwal | H04B 7/0695 |
| 2021/0022053 | A1* | 1/2021 | Cirik | H04B 7/0695 |
| 2021/0211181 | A1* | 7/2021 | Yang | H04W 74/0833 |

FOREIGN PATENT DOCUMENTS

| | | |
|---|---|---|
| CN | 109548192 A | 3/2019 |
| WO | 2019087360 A1 | 5/2019 |

OTHER PUBLICATIONS

3GPP TS 38.300, "3rd Generation Partnership Project; Technical Specification Group Radio Access Network; NR; NR and NG-RAN Overall Description; Stage2(Release 15)", Technical Specification, V15.5.0 (Mar. 2019).

3GPP TS 38.321, "3rd Generation Partnership Project; Technical Specification Group Radio Access Network;NR; Medium Access Control (MAC) protocol specification(Release 15)", Technical Specification, V15.5.0 (Mar. 2019).

3GPP TS 38.331, "3rd Generation Partnership Project; Technical Specification Group Radio Access Network;NR; Radio Resource Control (RRC) protocol specification(Release 15)", Technical Specification, V15.5.0 (Mar. 2019).

3GPP TS 38.321, "3rd Generation Partnership Project; Technical Specification Group Radio Access Network; NR; Medium Access Control (MAC) protocol specification (Release 15)", Technical Specification, V15.6.0 (Jun. 2019).

* cited by examiner

METHOD OF PERFORMING BEAM FAILURE RECOVERY AND RELATED DEVICE

CROSS-REFERENCE TO RELATED APPLICATION(S)

The present disclosure claims the benefit of and priority to U.S. provisional Patent Application Ser. No. 62/877,261 filed on Jul. 22, 2019, entitled "Method and apparatus for cancellation of beam failure recovery," (hereinafter referred to as "the '261 provisional"). The disclosure of the '261 provisional is hereby incorporated fully by reference into the present disclosure for all purposes.

FIELD

The present disclosure generally relates to wireless communications, and more particularly, to a method of performing beam failure recovery and a related device.

BACKGROUND

In the new radio (NR) Rel-15 technical standard, beamforming is a signal processing technique used in antenna arrays for directional signal transmission/reception. With beamforming, a beam can be formed by combining elements in a phased array of antennas in such a way that signals at particular angles experience constructive interference while others experience destructive interference. Different beams can be utilized simultaneously using multiple arrays of antennas. To increase the antenna gain over a wide sector beam, larger antenna arrays (number of antenna elements ranging from tens to hundreds) are used to form high gain beams.

Nonetheless, the high gain beams are narrow compared to a wide sector beam, so multiple beams for transmitting downlink (DL) common channels are needed to cover the required cell area. The number of concurrent high gain beams that an access point is able to form may be limited by the cost and complexity of the utilized transceiver architecture. In practice, on higher frequencies, the number of concurrent high gain beams is much lower than the total number of beams required to cover the cell area. In other words, the access point is able to cover only part of the cell area by using a subset of beams at any given time.

A next-generation node B (gNB) may utilize multiple beams to cover the entire service area and each user equipment (UE) may be associated with one of those beams. When the UE moves and/or the environment varies, the best beam for the UE may change. Hence, a Layer 1 (L1)/Layer 2 (L2) beam management procedure is initiated to switch the current beam to a new beam. The beam can be used on the DL control channel. The beam design should consider both coverage distance and robustness to UE's mobility. When considering the low data rate requirement but high reliability requirement on the control channel, the beam should be wide enough to allow reasonable UE's mobility.

However, beam misalignment may result in the loss of an ongoing link of the control channel ("beam failure"). The gNB may not be able to use the beam management procedure to switch to a new beam. Thus, a beam failure recovery (BFR) mechanism is introduced. The BFR procedure may be UE-triggered. The UE may determine a beam failure event according to measurement on a DL reference signal (RS), a control channel and/or a data channel. One example for beam failure determination is that the UE detects a low Reference Symbol Received Power (RSRP) of the current serving beam according to the measurement on the DL RS. If a beam failure is detected, the UE may notify the gNB of the beam failure event through an uplink (UL) transmission, so the gNB can act accordingly.

The UE may trigger a BFR procedure for indicating to the gNB of a new Synchronization Signal Block (SSB) or Channel State Information based Reference Signal (CSI-RS) when a beam failure is detected on the SSB(s) or CSI-RS(s). For beam failure detection, the gNB configures the UE with beam failure detection reference signals (e.g., SSB or CSI-RS), and the UE determines beam failure when the number of beam failure instance indications from a physical (PHY) layer reaches a configured maximum number before a pre-configured/pre-defined/pre-specified timer expires. A beam failure detection (BFD) may be performed based on the SSB associated to an initial DL bandwidth part (BWP), and may be configured for the initial DL BWP(s). For other DL BWP(s), the BFD may be performed based on CSI-RS.

After the beam failure is detected, the UE may perform a random access (RA) procedure for the BFR (referred to as triggering a random access channel (RACH) based BFR procedure in this disclosure). The UE may trigger the BFR by initiating the RA procedure on the primary cell (PCell), and select a suitable beam to perform the BFR (if the gNB has provided dedicated RA resources for certain beams, those may be selected by the UE). Upon completion of the RA procedure, the BFR is determined to be completed.

In NR Rel-15, the RACH-based BFR procedure is only applied for a Special Cell (SpCell) (e.g., PCell and Primary Secondary cell (PSCell)). In other words, if the beam failure happens on a Secondary cell (SCell), a network (NW) must handle it. For example, an SCell BFD may be performed based on either the absence of acknowledgment (ACK)/non-ACK (HACK) feedback for the scheduled DL transmission in the SCell, or based on a channel quality indicator (CQI) report in the SCell. If the beam failure occurs, the NW may release this SCell and re-schedule the data transmission. However, this may decrease scheduling efficiency and increase higher layer signaling propagation latency. In order to quickly recover the beam (e.g., switching the serving beam) from the beam failure on the SCell, in NR Rel-16, an SCell BFR is supported.

SUMMARY

The present disclosure provides a method of performing beam failure recovery and a related device.

According to an aspect of the present disclosure, a method for a user equipment (UE) performing a beam failure recovery (BFR) procedure is provided. The method comprises performing a first beam failure detection (BFD) procedure on a first cell, performing a second BFD procedure on a second cell, triggering a first BFR procedure for the first cell in response to a beam failure being detected on the first cell by the first BFD procedure, triggering a second BFR procedure for the second cell in response to a beam failure being detected on the second cell by the second BFD procedure, and canceling the triggered first BFR procedure for the first cell in response to a BFR report corresponding to at least one of the first and second BFR procedures being successfully transmitted to a base station (BS), wherein the BFR report includes BFR information of the first cell.

According to another aspect of the present disclosure, a user equipment (UE) for performing a beam failure recovery (BFR) procedure is provided. The UE comprises a processor, for executing computer-executable instructions, and a non-transitory machine-readable medium, coupled to the processor, for storing the computer-executable instructions, wherein the computer-executable instructions instruct the processor to performing a first beam failure detection (BFD) procedure on a first cell, performing a second BFD procedure on a second cell, triggering a first BFR procedure for the first cell in response to a beam failure being detected on the first cell by the first BFD procedure, triggering a second BFR procedure for the second cell in response to a beam failure being detected on the second cell by the second BFD procedure, and canceling the triggered first BFR procedure for the first cell in response to a BFR report corresponding to at least one of the first and second BFR procedures being successfully transmitted to a base station (BS), wherein the BFR report includes BFR information of the first cell.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

DESCRIPTION

Figure 1:
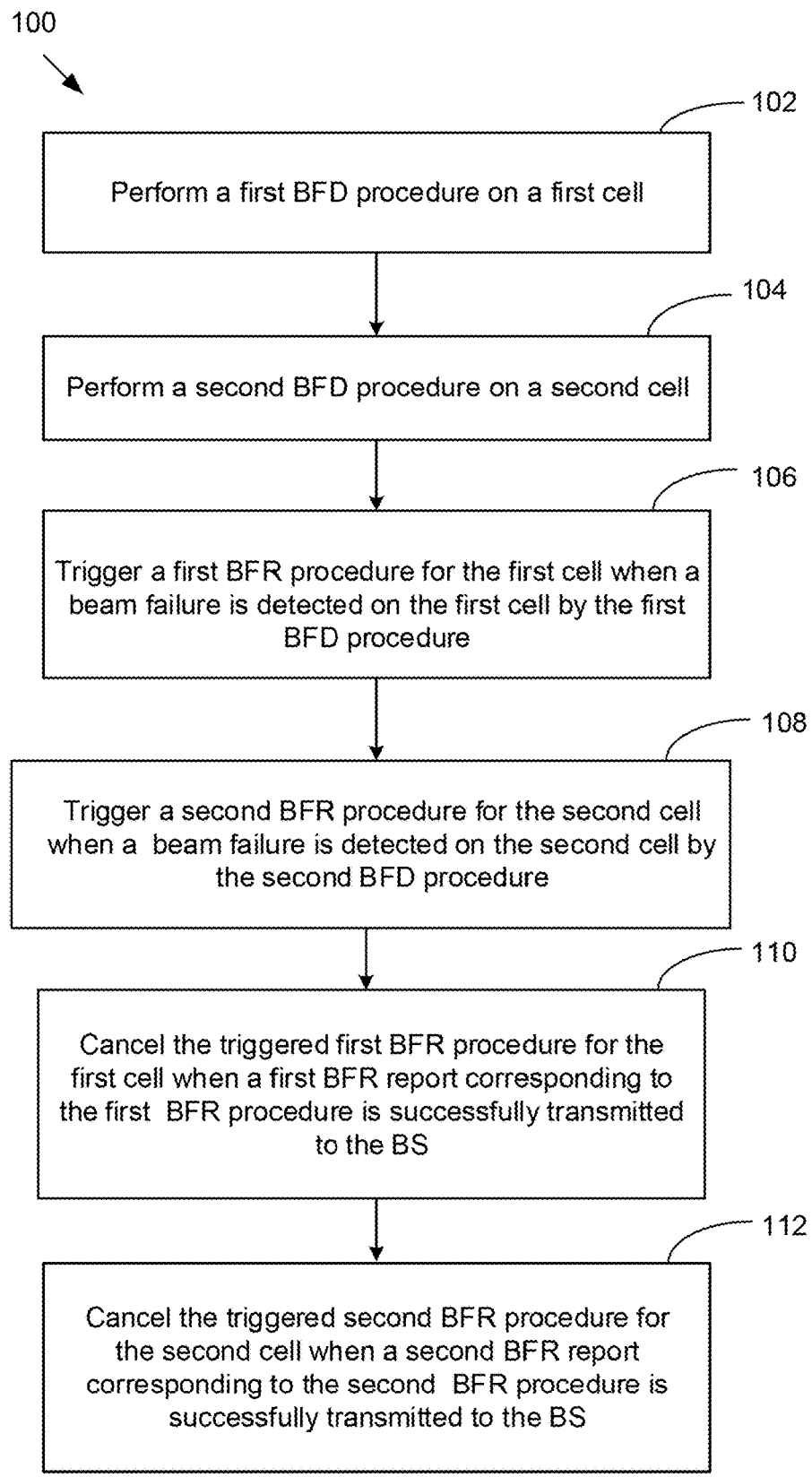
FIG. 1 is a flowchart illustrating two SCell beam failure detection (BFD) procedures and two SCell beam failure recovery (BFR) procedures, in accordance with example implementations of the present disclosure.

The following description contains specific information pertaining to exemplary implementations in the present disclosure. The drawings and their accompanying detailed description are directed to exemplary implementations. However, the present disclosure is not limited to these exemplary implementations. Other variations and implementations of the present disclosure will occur to those skilled in the art. Unless noted otherwise, like or corresponding elements in the figures may be indicated by like or corresponding reference numerals. Moreover, the drawings and illustrations are generally not to scale and are not intended to correspond to actual relative dimensions.

For consistency and ease of understanding, like features are identified (although, in some examples, not shown) by numerals in the exemplary figures. However, the features in different implementations may be different in other respects, and therefore shall not be narrowly confined to what is shown in the figures.

The phrases "in one implementation," and "in some implementations," may each refer to one or more of the same or different implementations. The term "coupled" is defined as connected, whether directly or indirectly via intervening components, and is not necessarily limited to physical connections. The term "comprising" means "including, but not necessarily limited to" and specifically indicates open-ended inclusion or membership in the described combination, group, series, and equivalents.

Additionally, any two or more of the following paragraphs, (sub)-bullets, points, actions, behaviors, terms, alternatives, examples, or claims described in the following disclosure may be combined logically, reasonably, and properly to form a specific method. Any sentence, paragraph, (sub)-bullet, point, action, behaviors, terms, or claims described in the following disclosure may be implemented independently and separately to form a specific method. Dependency, e.g., "based on", "more specifically", "preferably", "In one embodiment", "In one implementation", "In one alternative" etc., in the following disclosure refers to just one possible example that would not restrict the specific method.

For explanation and non-limitation, specific details, such as functional entities, techniques, protocols, and standards are set forth for providing an understanding of the described technology. In other examples, detailed description of well-known methods, technologies, system, and architectures are omitted so as not to obscure the description with unnecessary details.

Persons skilled in the art will recognize that any described network function(s) or algorithm(s) may be implemented by hardware, software, or a combination of software and hardware. Described functions may correspond to modules that are software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of applications specific integrated circuitry (ASIC), programmable logic arrays, and/or using one or more digital signal processor (DSPs). Although some of the disclosed implementations are directed to software installed and executing on computer hardware, alternative implementations as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc (CD) read-only memory (CD ROM), magnetic cassettes, magnetic tape, magnetic disk storage, or any other equivalent medium capable of storing computer-readable instructions.

A radio communication network architecture (e.g., a long term evolution (LTE) system, an LTE-Advanced (LTE-A) system, an LTE-A Pro system, or an New Radio (NR) system typically includes at least one base station (BS), at least one UE, and one or more optional network elements that provide connection with a network. The UE communicates with the network (e.g., a core network (CN), an evolved packet core (EPC) network, an Evolved Universal Terrestrial Radio Access Network (RAN) (E-UTRAN), a Next-Generation (GN) Core (NGC), 5G CN (5GC), or an internet via a RAN established by the BS.

It should be noted that, in the present disclosure, a UE may include, but is not limited to, a mobile station, a mobile terminal or device, a user communication radio terminal. For example, a UE may be a portable radio equipment, that includes, but is not limited to, a mobile phone, a tablet, a wearable device, a sensor, or a personal digital assistant (PDA) with wireless communication capability. The UE is configured to receive and transmit signals over an air interface to one or more cells in a RAN.

A BS may include, but is not limited to, a node B (NB) as in the UMTS, an evolved node B (eNB) as in the LTE-A, a radio network controller (RNC) as in the UMTS, a BS controller (BSC) as in the Global System for Mobile communications (GSM)/GSM Enhanced Data rates for GSM Evolution (EDGE) RAN (GERAN), a Next Generation (NG)-eNB as in an Evolved Universal Terrestrial Radio Access (E-UTRA) BS in connection with the 5GC, a gNB as in the 5G-RAN, and any other apparatus capable of controlling radio communication and managing radio resources within a cell. The BS may connect to serve the one or more UEs via a radio interface to the network.

A BS may be configured to provide communication services according to at least one of the following radio access technologies (RATs): Worldwide Interoperability for Microwave Access (WiMAX), GSM (often referred to as 2G), GERAN, General Packet Radio Service (GRPS), UMTS (often referred to as 3G) according to basic wideband-code division multiple access (W-CDMA), high-speed packet access (HSPA), LTE, LTE-A, evolved LTE (eLTE), New Radio (NR, often referred to as 5G), and/or LTE-A Pro. However, the scope of the present disclosure should not be limited to these protocols.

The BS is operable to provide radio coverage to a specific geographical area using a plurality of cells forming the RAN. The BS supports the operations of the cells. Each cell is operable to provide services to at least one UE within radio coverage of the cell. More specifically, each cell (often referred to as a serving cell) provides services to serve one or more UEs within the cell's radio coverage, (e.g., each cell schedules the DL and optionally UL resources to at least one UE within the cell's radio coverage for DL and optionally UL packet transmissions). The BS can communicate with one or more UEs in the radio communication system via the plurality of cells. A cell may allocate sidelink (SL) resources for supporting proximity service (ProSe), LTE SL service, and LTE/NR V2X services. Each cell may have overlapped coverage areas with other cells.

FIG. 1 illustrates a method 100 for a UE to perform two SCell BFD procedures and two SCell BFR procedures. In action 102, the UE performs a first beam failure detection (BFD) procedure on a first cell. In action 104, the UE performs a second BFD procedure on a second cell. In action 106, the UE triggers a first BFR procedure for the first cell when a beam failure is detected on the first cell by the first BFD procedure. In action 108, the UE triggers a second BFR procedure for the second cell when a beam failure is detected on the second cell by the second BFD procedure. In action 110, the UE cancels the triggered first BFR procedure for the first cell when a first BFR report corresponding to the first BFR procedure is successfully transmitted to the BS. In action 112, the UE cancels the triggered second BFR procedure for the second cell when a second BFR report corresponding to the second BFR procedure is successfully transmitted to the BS. The first BFR report may be identical to the second BFR report (e.g., generated by the same BFR Medium Access Control (MAC) control element (CE)), or different from the second BFR report.

The method 100 provides the cell-based BFD procedure and cell-based BFR procedure by which the UE respectively cancels the triggered BFR procedure for the first cell and the second cell. In other words, the triggered BFR procedure is canceled on a per-cell basis.

In one implementation, the UE may detect a beam failure on the SCell #1, and then trigger a BFR procedure for the SCell #1. Meanwhile, the UE may detect a beam failure on the SCell #2, and then trigger a BFR procedure for the SCell #2. The UE may transmit a BFR report (e.g., BFR MAC CE) corresponding to the triggered BFR procedure of the SCell #1, to the BS. In one example, the UE may cancel the triggered BFR procedure of the SCell #1 and not cancel the triggered BFR procedure of the SCell #2 when the BFR report including only BFR information of the SCell #1 is successfully transmitted to the BS. The BFR information of the SCell #1 includes both a cell identity of the SCell #1 and a measured candidate beam of the SCell #1. It is noted that the BFR report is successfully transmitted when the UE receives a BFR response via a physical downlink control channel (PDCCH) from the BS, and thus the UE may determine the BFR procedure of the SCell #1 is completed when the BFR response is received from the BS. In some implementations, the BFR report is successfully transmitted when the UE receives a BFR response via the PDCCH addressed to Cell Radio Network Temporary Identifier (C-RNTI) indicating a UL grant for a new transmission for the Hybrid Automatic Repeat Request (HARD) process used for the transmission of the BFR report. In another example, the UE may cancel the triggered BFR procedure of the SCell #1 and not cancel the triggered BFR procedure of the SCell #2 when receiving a deactivation command (e.g., SCell activation/deactivation MAC CE) from the BS to deactivate the SCell #1. In other examples, the UE may cancel the triggered BFR of the SCell #1 and not cancel the triggered BFR of the SCell #2 when a deactivation timer associated with the SCell #1 expires.

In some implementations, the UE may cancel the triggered BFR procedure of the SCell #1 and cancel the triggered BFR procedure of the SCell #2 when the BFR report including both BFR information of the SCell #1 and the SCell #2 is successfully transmitted to the BS. The BFR information of the SCell #1 includes both the cell identity of the SCell #1 and the measured candidate beam of the SCell #1, and the BFR information of the SCell #2 includes both a cell identity of the SCell #2 and a measured candidate beam of the SCell #2.

In some implementations, the UE may cancel the triggered BFR procedure of the SCell #1 if the SCell #1 is deactivated, and cancel the triggered BFR procedure of the SCell #2 if the SCell #2 is deactivated. For example, the UE may cancel the triggered BFR procedure of the SCell #1 when the deactivation timer associated with the SCell #1 is expired or the deactivation command for deactivating the SCell #1 is received from the BS, and cancel the triggered BFR procedure of the SCell #2 when the deactivation timer associated with the SCell #2 is deactivated and the deactivation command for deactivating the SCell #2 is received from the BS.

Figure 2:
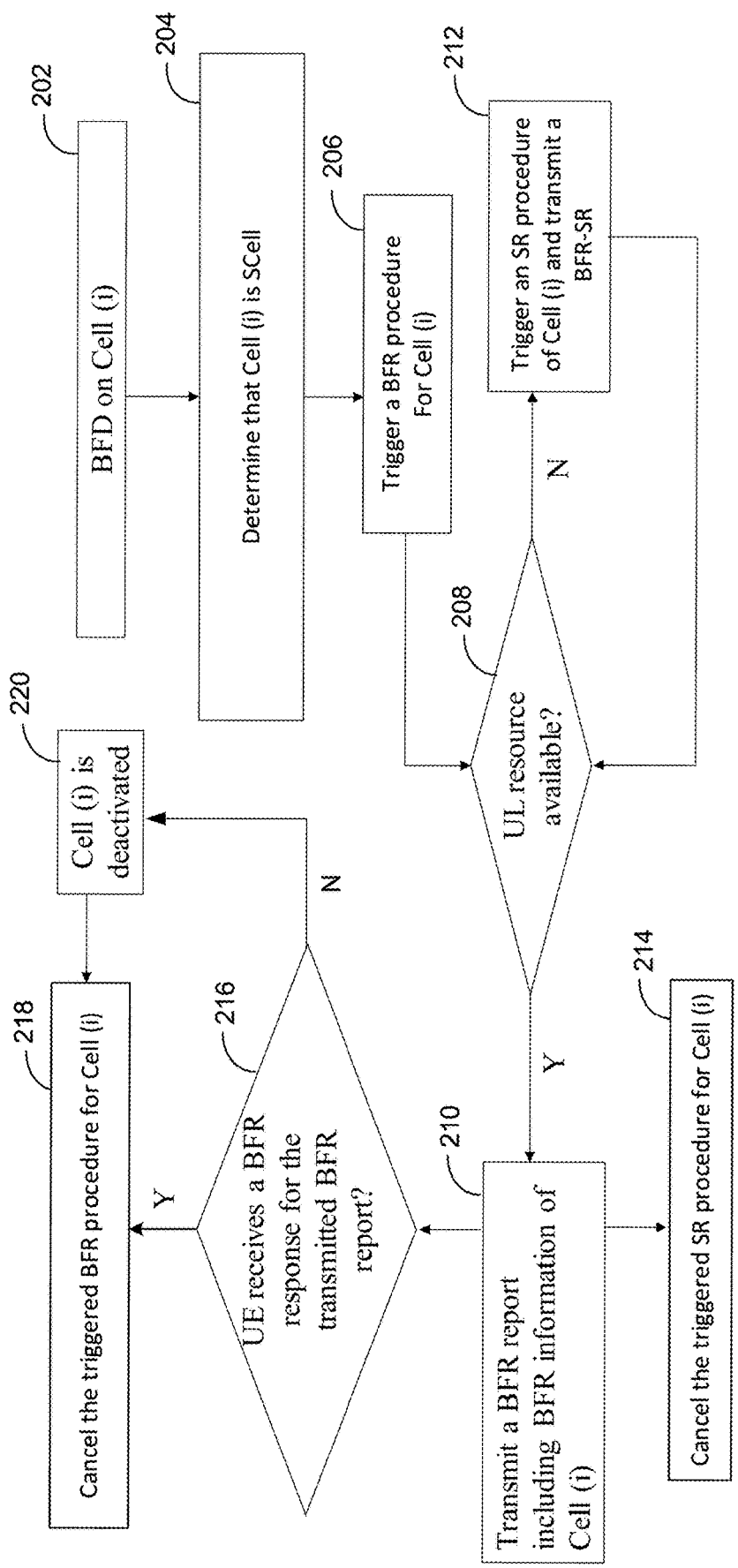
FIG. 2 is a schematic diagram illustrating an SCell BFR procedure that includes triggering and cancelling an SR procedure for a Cell (i), in accordance with example implementations of the present disclosure.

FIG. 2 is a flowchart illustrating an SCell BFR procedure that includes triggering and cancelling a SR procedure for SCell BFR of a Cell (i). The UE performs BFD on the Cell (i), and may determine a beam failure being detected if the "BFI_COUNTER" reaches (e.g., is greater than or equal to) a maximum number (e.g., action 202). The UE determines the Cell (i) is a SpCell or an SCell (e.g., action 204). The UE triggers a BFR procedure for the Cell (i) if the Cell (i) is determined as an SCell (e.g., action 206). The UE further determines whether a UL resource is available for BFR report (e.g., action 208). If a UL resource is available, the UE transmits the BFR report (e.g., BFR MAC CE including BFR information of the Cell (i)) to the BS via the UL resource (e.g., action 210). On the contrary, if a UL resource is not available, the UE triggers an SR procedure of the Cell(i) (e.g., action 212). Moreover, for the triggered SR procedure, the UE may transmit a BFR-SR to the BS to request the UL resource (e.g., action 212). After transmitting the BFR report with the UL resource, the UE cancels the triggered SR procedure of the Cell (i) (e.g., action 214). In addition, the UE determines whether a BFR response corresponding to the BFR report is received from the BS (e.g., action 216). If yes, the UE cancels the triggered BFR procedure for the Cell (i), and may set "BFI_COUNTER" (of Cell (i)) to '0' (e.g., action 218). Moreover, the UE determines the SCell BFR procedure is completed when the BFR response is received from the BS. On the other hand, the UE may cancel the triggered BFR procedure for the Cell (i) if the Cell (i) is deactivated (e.g., action 220). The UE may further set "BFI_COUNTER" to '0' when the Cell (i) is deactivated. The condition of Cell (i) deactivation can be referred from above, so it is omitted herein.

The UL resource mentioned above may be RACH resource, physical uplink control channel (PUCCH) resource, and/or physical uplink shared channel (PUSCH) resource. The UL resource may be scheduled by dynamic grant (e.g., via a PDCCH) and/or configured by a radio resource control (RRC) signaling (e.g., type 1/type 2 configured UL grant or pre-configured in RRC configuration).

Figure 3:
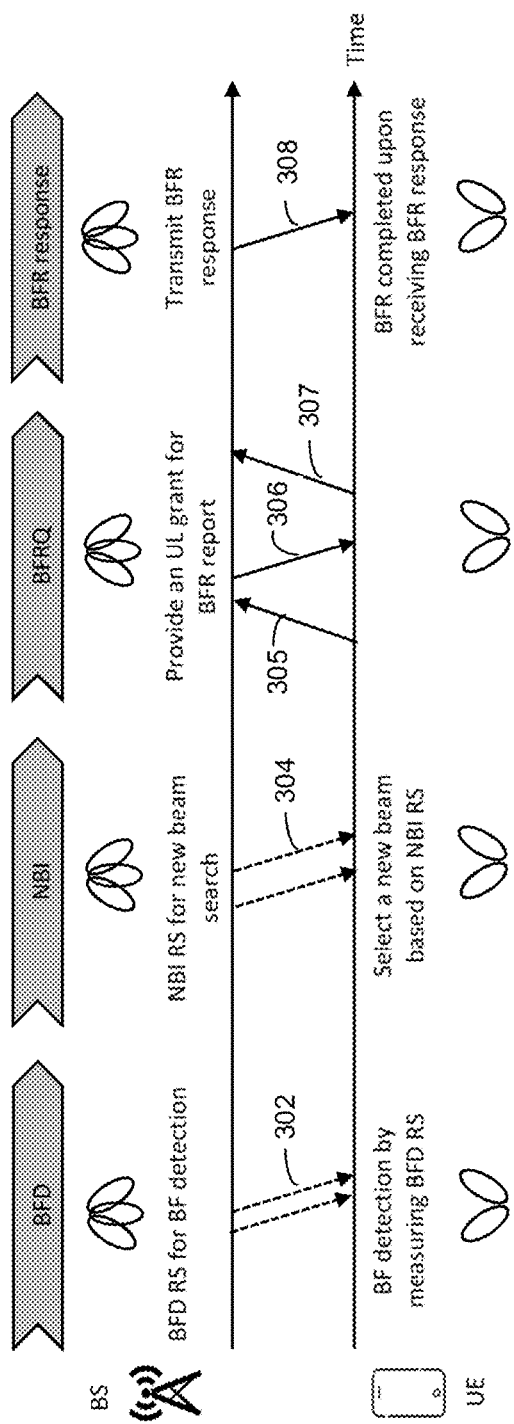
FIG. 3 is a schematic diagram illustrating actions for beam failure recovery of a cell, in accordance with example implementations of the present disclosure.

With reference to FIG. 3, there may be four steps (as shown below) for beam failure recovery of a cell.

Step 1: Beam Failure Detection (BFD) Procedure

The BS may explicitly or implicitly configure the BFD RS for the UE to detect beam failure (BF) (e.g., action 302). The UE may measure the BFD RS for beam failure detection. When configured implicitly, the BFD RS may be transmitted in an active BWP of either the current component carrier (CC) or another CC. A PHY layer of the UE may assess the radio link quality according to the BFD RS, and may provide a beam failure instance indication to a MAC entity of the UE when the radio link quality is worse than a threshold with a periodicity. That is, the MAC entity of UE may receive the beam failure instance indication from the PHY layer. Beam failure may be detected if the number of (consecutive) detected beam failure instance indications exceeds a configured maximum number (e.g., by the RRC signaling), namely beamFailureInstanceMaxCount. One beamFailureInstanceMaxCount may be configured for each BWP/cell/sub set of a cell group/cell group. On the other hand, a counter may be used for counting the number of beam failure instance indications, namely "BFI_COUNTER". The "BFI_COUNTER" may be used for each BWP/cell/subset of a cell group/cell group. Beam failure detection timer which resets the BFI_COUNTER upon expiration, namely beamFailureDetectionTimer. The beamFailureDetectionTimer may be configured for each BWP/cell/subset of a cell group/cell group.

In addition, when a beam failure of an SCell is detected, the UE may trigger a BFR procedure for the SCell and transmit a beam failure recovery request (BFRQ). A BFRQ may be a BFR report that includes the BFR information of the SCell. Alternatively, a BFRQ may be a BFR-SR, which may be transmitted on a dedicated PUCCH resource for BFR-SR transmission. In one implementation, the UE may trigger a SR procedure of the SCell that has detected beam failure and has triggered a BFR procedure. When there is at least one triggered and uncancelled SR procedure (from at least one cell that has detected beam failure), the UE may transmit a BFR-SR on a dedicated PUCCH resource for BFR-SR transmission. In one implementation, a "triggered SR procedure" may also be referred to as a "triggered SR for SCell BFR". In one implementation, a PUCCH resource for BFR-SR transmission may be configured by the network via dedicated signaling.

The BFD RS may be a set of reference signals (e.g., SSB and/or CSI-RS). Different sets of the BFD RSs may be associated with different CC (or cell)s, sets/groups of cells, transmission and reception points (TRPs). For example, a first set of the BFD RSs is associated with a first CC/cell. If the UE detects that the quality of the first set of the BFD RSs that the UE uses to assess the radio link quality are all lower than a threshold with a periodicity determined by the maximum between the shortest periodicity among the periodic CSI-RS configurations, and/or SSBs on the PCell or the PSCell, in the first set, a PHY layer of the UE may send a beam failure instance indication to a MAC entity of the UE for the first CC/cell. Subsequently, based on the BFD procedure, the MAC entity may increment the BFI_COUNTER of the first CC/cell by '1' for each received beam failure instance indication for the first CC/cell. The beam failure is considered as being detected for the first CC/cell if the number of beam failure instances has reached a configured maximum number for the first CC/cell. On the other hand, if no BFD RSs are provided for a CC (or a cell) for beam failure detection, the UE may perform beam monitoring based on the activated Transmission Configuration Indication (TCI) state for PDCCH of the CC (or cell). The BFD RS may be transmitted in (active BWP of) either current CC or another CC (e.g., within the same band). The BFD RS may be configured together with the BFR-SR (e.g., in the same configuration).

Figure 4:
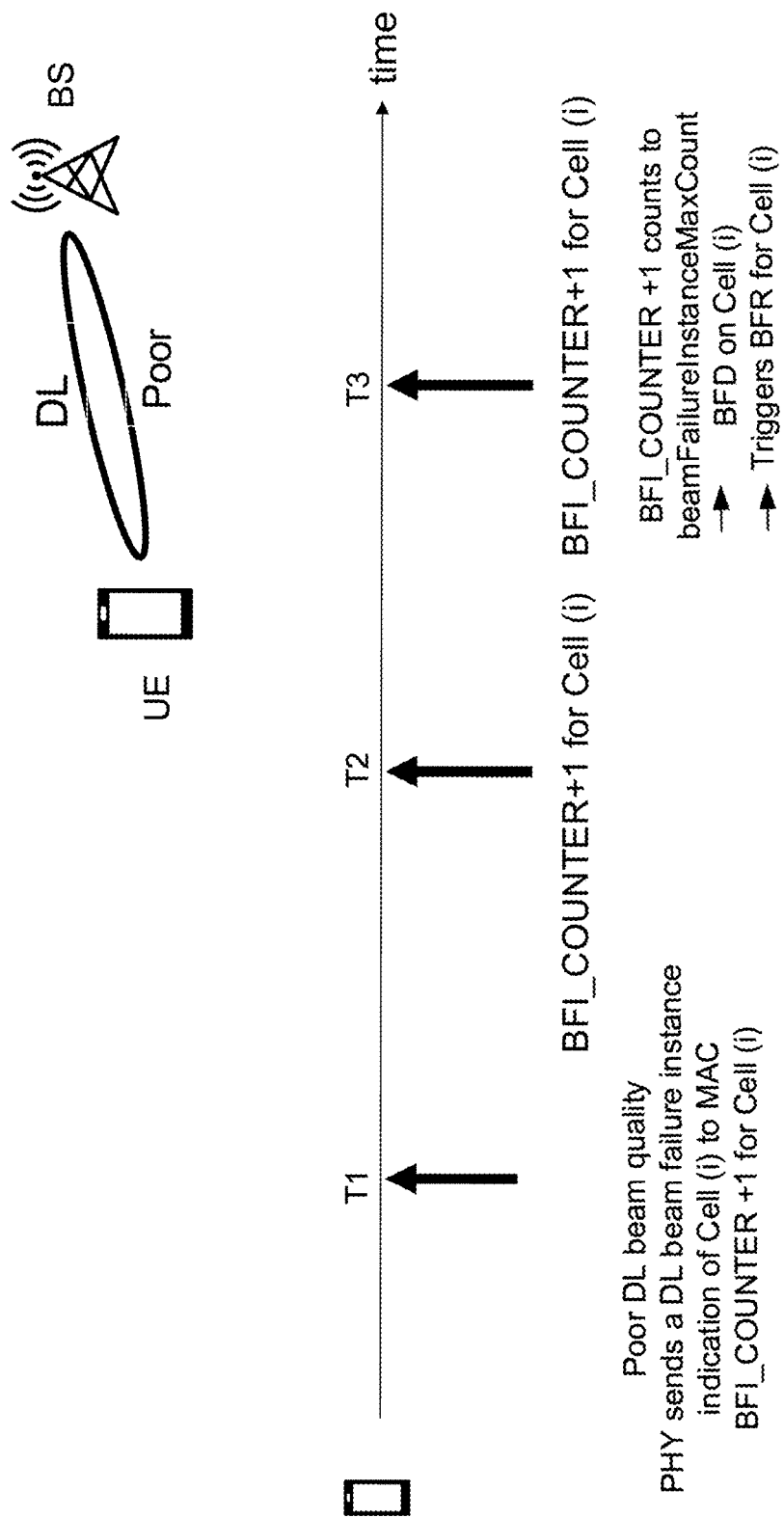
FIG. 4 is a flowchart illustrating a BFD procedure for a Cell (i), in accordance with example implementations of the present disclosure.

Moreover, as shown in FIG. 4, BFD procedure of a cell is disclosed, the UE detects a poor DL beam quality of Cell (i) based on the measurement (e.g., assessing the radio link quality) of the BFD-RS for Cell (i). The PHY layer of the UE sends a beam failure instance indication of Cell (i) to the MAC entity of the UE, and thus a value of "BFI_COUNTER" for Cell (i) is incremented by '1' (e.g., in time T1, T2, and T3). When the "BFI_COUNTER" for Cell (i) of the MAC entity is reaches a maximum number (e.g., a value of "beamFailureInstanceMaxCount"), the UE in time T3 determines a beam failure is detected on the Cell (i).

Step 2: New Beam Identification (NBI)

The UE may select a new beam (or a candidate beam) for a serving cell of the BS based on a measured NBI RS (e.g., the L1-RSRP measurement result is higher than a threshold) (e.g., action 304).

The new beam may be indicated via a reference signal (e.g., SSB, CSI-RS, and/or Sounding Reference Signal (SRS), and/or TCI state.

The NBI RS may be a set of reference signals (e.g., SSB and/or CSI-RS) that is used for new beam identification. Different sets of the NBI RSs may be configured for different CCs (or cells), sets/groups of cells, TRPs, and/or BWPs. For example, a first set of the NBI RSs is configured for a first CC (or cell). If the beam failure occurs on the first CC (or cell), the UE may select a new beam according to the measured first set of the NBI RSs. The UE may select a new beam with the highest RSRP in the first set of the NBI RS. Alternatively, the UE may select any new beam in the first set of the NBI RS that is above a configured threshold. The UE may include the information of the NBI RS (e.g., the selected new beam) in the BFR report. The NBI RS may be transmitted in (active BWP of) the CC that is configured to be monitored for BFR or another CC within the same band.

Step 3: Beam Failure Recovery Request (BFRQ)

The UE may send a BFR-SR over PCell, PSCell, and/or SCell to the BS (e.g., action 305). The BFR-SR may be used to inform a beam failure event on an CC (s) and/or to request a UL resource. It is noted that whether the BFR-SR should be sent may be based on if any UL resource is available. If no UL resource is available, the BS may send a UL grant to the UE (e.g., action 306) upon reception of the BFR-SR from the UE (e.g., action 305). After that, the UE may send the BFR report (e.g., by MAC CE) (e.g., action 307). The BFR report may include the failed CC(s) information (e.g., Cell index), new beam(s) information (e.g., the new beam may be selected based on measuring NBI RS), and/or no new beam information (e.g., no new beam with L1-RSRP higher than a threshold).

The BFR-SR may be transmitted on a dedicated PUCCH resource for BFR-SR transmission. The BFR-SR may be used to inform the BS with a beam failure event and/or used for requesting a UL-SCH resource for BFR report transmission. The UL resource requested by BFR-SR may (only) be used for BFR report transmission. The UE may be configured with zero, one, or more BFR-SR configuration. Moreover, each SR procedure (of a cell) may correspond to zero, one, or more BFR-SR configuration. The PUCCH resource for BFR-SR transmission may be configured per BWP, per TRP, per CC, per set of CCs, per configured grant (CG), and/or per UE. The BFR-SR may be a cross-cell transmission. For example, a beam failure is detected on the SCell, but the BFR-SR is transmitted on the PCell. The BFR-SR configuration may be a specific configuration that is different from the SR configurations (e.g., the identity (ID) of the BFR-SR configuration is different from the "schedulingRequestid" of the SR configurations). Alternatively, the BFR-SR configuration may be one of the SR configurations (e.g., the ID of BFR-SR configuration is shared with "schedulingRequestid" of the SR configurations.) The BFR-SR (e.g., the PUCCH resource for BFR-SR transmission) may be assigned with the highest priory of the SR configuration. The BFR-SR configuration may be configured per BWP, per TRP, per CC, per set of CCs, per CG, and/or per UE.

The BFR-SR transmission may be replaced by a Physical Random Access Channel (PRACH) transmission. For example, the UE may perform PRACH transmission (e.g., transmits preamble) to request a UL resource for transmitting the BFR report.

The BFR report may be transmitted on any available UL grant that may accommodate the BFR report. Alternatively, the BFR report may (only) be transmitted on the UL grant which is requested by the BFR-SR. The BFR report may be transmitted on PUSCH. In addition, the BFR report may include one or more of the following BFR information:
- (failed) CC (or cell) information (e.g., cell index);
- (failed) a set/group (s) of cells (e.g., the set/group may be pre-configured by BS);
- (failed) TRP information;
- measurement result (e.g., RSRP, Signal to Interference plus Noise Ratio (SINR), etc.) of the (failed) CC, set/group of cells, TRP;
- candidate beam information (or new beam information), e.g., one or more qualified beam (selected by the UE) based on measuring the set of NBI RS of the (failed) CC; and
- no new beam information (e.g., if there is no new beam with RSRP higher than a threshold for the (failed) CC, set/group of cells, TRP).

The BFR report may be replaced by Uplink Control Information (UCI) transmission. For example, the BFR-related information (e.g., (failed) CC (or cell) information (e.g., cell index), (failed) set/group(s) of cells (e.g., the set/group may be pre-configured by the NW), (failed) TRP information, the corresponding measurement result (e.g., RSRP, SINR, etc.) of the (failed) CC, set/group of cells, TRP, Candidate beam information (or new beam information) (e.g., one or more qualified beam based on measuring NBI RS), no new beam information (e.g., if there is no new beam with RSRP higher than a threshold for the (failed) CC, set/group of cells, TRP)) may be included in the UCI.

In one example, the BFR report may be transmitted (only) via the UL grant which is requested by BFR-SR. In other examples, the BFR report may be transmitted via any UL grant (e.g., UL grant via RAR, dynamic UL grant via PDCCH, and/or configured grant).

The "beam information" mentioned above is used to provide information about which the beam/spatial filter is being used/selected. In one example, individual reference signals are transmitted by applying individual beams (spatial filters). Thus, the beam or the beam information may be represented by reference signal resource index(es).

Step 4: Beam Failure Recovery Response (BFR Response)

After transmitting the BFRQ (e.g., BFR-SR and/or BFR report), the UE may attempt to monitor a BFR response (e.g., via PDCCH monitoring) from the BS (e.g., action 308). In one example, the BFR response may be transmitted on PCell, PSCell and/or SCell. In other examples, the BFR response may be transmitted on an CC, where the UE transmits the BFRQ on the CC. Upon receiving the BFR response, the UE may consider the BFR procedure on the CC as being completed. In one example, the BFR response may be a PDCCH. In one example, the BFR response may be a PDCCH addressed to C-RNTI indicating a UL grant for a new transmission for the HARQ process used for the transmission of the BFR report. In one implementation, the UE may cancel the triggered BFR procedure of an SCell if it has received a BFR response for a transmitted BFR report, and the BFR report includes beam failure information of the SCell that triggered the BFR procedure.

It is noted that when a beam failure is detected on an SCell (e.g., the number of (consecutive) detected beam failure instance indications exceeds a configured maximum number (e.g., "beamFailureInstanceMaxCount") for an SCell with ID(i)), a BFR procedure may be triggered by a MAC entity of the UE. The BFR procedure may be an operation for BFR report generation and/or transmission. Subsequently, if at least one BFR procedure is triggered (e.g., BFR procedure is triggered for one or more cells) and is not canceled, the MAC entity may determine whether a UL resource is available for a new transmission. If so, the MAC entity may instruct the Multiplexing and Assembly procedure to generate a BFR MAC CE for BFR report transmission. Otherwise, the MAC entity may instruct a PHY layer of the UE to transmit a BFR-SR to the BS. Subsequently, a BFRQ-SR timer may be started at a certain time, (e.g., upon the PHY layer performing the first BFR-SR transmission after being instructed by the MAC entity). The purpose of the BFRQ-SR timer is to ensure that the UE may perform subsequent procedure(s) if it does not receive any response, (e.g., a UL grant, from the BS within a period after transmission of the BFR-SR). If a UL resource is available while the BFRQ-SR timer is running, the MAC entity may instruct the Multiplexing and Assembly procedure to generate the BFR MAC CE, and stop/restart the running BFRQ-SR timer when the BFR MAC CE is transmitted. On the other hand, some subsequent procedures, such as an RA procedure, may be initiated when the BFRQ-SR timer expires.

In some implementations, the BFR procedure may be performed according to each cell. For example, if a beam failure is detected based on a first BFD RS associated with the cell #1, a first BFR procedure corresponding to the cell #1 is triggered. If a beam failure is detected based on a second BFD RS associated with the cell #2, a second BFR procedure corresponding to the cell #2 is triggered. If a third beam failure is detected based on a third BFD RS, which is associated with the cell #3 and cell #4, a third BFR procedure corresponding to the cell #3 and a fourth BFR procedure corresponding to the cell #4 are both triggered. Preferably, the first BFR procedure and the second BFR procedure may be performed independently. Preferably, the first BFR procedure may be used to transmit the BFR MAC CE including the BFR information for the cell #1 only; the second BFR procedure may be used to transmit the BFR MAC CE including the BFR information for the cell #2 only; the third and fourth BFR procedure may be used to transmit the BFR MAC CE including the BFR information for both of the cell #3 and the cell #4. More specifically, a BFD RS (set) may be associated with one single cell or multiple cells.

In some implementations, the BFR procedure may be performed according to a cell group. For example, if a beam failure is detected based on a first BFD RS associated with the cell #1 and a beam failure is detected based on a second BFR RS associated with the cell #2, one single cell group based BFR procedure may be triggered for both of the cell #1 and cell #2. Preferably, one single BFR procedure may be used to transmit the BFR MAC CE including the BFR information for both of the cell #1 and the cell #2. More specifically, a BFD RS (set) may be associated with a group of cells.

In some implementations, the BFR procedure may be performed according to a sub-cell group. A sub cell group may include one or multiple SCells. For example, if a beam failure is detected based on a first BFD RS associated with the sub cell group #1 including multiple SCells, a first BFR procedure corresponding to the sub cell group #1 may be triggered for the sub cell group #1; if a beam failure is detected based on a second BSD RS associated with the sub cell group #2 including multiple SCells, a second BFR procedure corresponding to the sub cell group #2 may be triggered. Preferably, the first BFR procedure may be used to transmit the BFR MAC CE including the BFR information for the sub cell group #1 only; the second BFR procedure may be used to transmit the BFR MAC CE including the BFR information for the sub cell group #2 only. More specifically, a BFD RS (set) may be associated with a group of cells.

The PHY layer of the UE may continuously transmit the BFR-SR on the PUCCH resource for BFR-SR transmission when the BFRQ-SR timer is running. The detailed operation (e.g., when to start/restart/stop) of the BFRQ-SR timer is described below. More specifically, the BFRQ-SR timer may be configured according to each BWP in the SpCell (e.g., one BFRQ-SR timer may be configured on each BWP in the SpCell). Alternatively, a single BFRQ-SR timer may be configured on the SpCell.

The purpose of the BFRQ-SR timer is to control the BFR-SR transmission. For example, when the BFRQ-SR timer is running, the UE may transmit the BFR-SR on a valid PUCCH resource for BFR-SR transmission. When the BFRQ-SR timer is not running, the UE may not transmit the BFR-SR (even if the BFR procedure has been triggered and is not canceled).

In one example, the BFRQ-SR timer may be started/restarted when the MAC entity instructs the PHY entity for BFR-SR transmission, and there is a valid PUCCH resource for BFR-SR transmission.

In one example, the BFRQ-SR timer may be started/restarted when the PHY performs the first BFR-SR transmission after being instructed by the MAC entity for BFR-SR transmission.

The BFRQ-SR timer may be started or restarted if one or more combinations of the following conditions is satisfied:

1. there is a valid PUCCH resource for BFR-SR transmission;
2. the BFR procedure is triggered and is not canceled;
3. there is no UL resource available for transmission;
4. upon the MAC entity instructs PHY for BFR-SR transmission; and
5. upon the PHY layer performs the first BFR-SR transmission after being instructed by the MAC entity for BFR-SR transmission.

The running BFRQ-SR timer may be stopped if one or more combinations of the following conditions is satisfied:

Condition 1: Transmission of a BFR MAC CE

In one implementation, the running BFRQ-SR timer may be stopped upon transmission of a MAC Protocol Data Unit (PDU) that includes a BFR MAC CE.

In some implementations, the running BFRQ-SR timer may be stopped only if the BFR MAC CE includes all the SCells of a cell group that detects beam failure prior to the MAC PDU assembly.

Condition 2: Reconfiguration of BFR Related Parameter(s) on the SCell(s)

In one implementation, the running BFRQ-SR timer may be stopped upon reconfiguration of SCell related BFR parameter(s).

In some implementations, the BFR related parameter configured on the SCell(s) may include parameters associated with NBI RS(s) configured on the SCell(s), BFD RS(s) configured on the SCell(s), the BFRQ-SR timer, and parameters for beam failure detection that are configured on the SCell(s), where the parameters for beam failure detection may include "beamFailureDetectionTimer" and "beamFailureInstanceMaxCount".

Condition 3: Reconfiguration of BFR Related Parameter(s) Configured on the SpCell.

In one implementation, the running BFRQ-SR timer may be stopped upon reconfiguration of SpCell related BFR parameter(s).

In some implementations, the BFR related parameter(s) configured on the SpCell may include a parameter associated with PUCCH resource(s), where the PUCCH resource(s) may be configured on a SpCell, a BWP or a cell for the BFR-SR transmission.

Condition 4: Initiation of RACH-Based BFR Procedure

In one implementation, if a BFR procedure is triggered at the SpCell, the running BFRQ-SR timer may be stopped by the MAC entity.

In some implementations, RACH-based BFR procedure is triggered if the number of beam failure instance indications of the SpCell is equal to or above a maximum number configured for the SpCell. The RACH-based BFR procedure triggered at the SpCell may be referred to as an RA procedure.

Condition 5: Deactivation of SCell

In one implementation, the running BFRQ-SR timer may be stopped by the MAC entity if all the configured SCell(s) are deactivated.

In some implementations, the SCell may be deactivated when an SCell deactivation timer associated with the activated SCell expires.

In some implementations, the SCell may be deactivated upon reception of an SCell activation/deactivation MAC CE deactivating the SCell.

In some implementations, the running BFRQ-SR timer may be stopped by the MAC entity if an SCell which triggers a BFR procedure and subsequently results in BFR-SR transmission (e.g., due to absence of UL resource) is deactivated.

In some implementations, the BFR procedure may be a cell-based or a cell-group based BFR procedure.

In some implementations, the SCell may be deactivated upon reception of an SCell activation/deactivation MAC CE for deactivating the SCell.

In some implementations, the SCell may be deactivated when an SCell deactivation timer associated with the activated SCell expires.

Condition 6: Cancellation of BFR Procedure

In one implementation, if all triggered BFR procedure(s) in the MAC entity are canceled, the running BFRQ-SR timer may be stopped by the MAC entity.

In some implementations, the BFR procedure may be a cell-based or a cell-group based BFR procedure.

Condition 7: BWP Switch/Deactivation

In one implementation, if the UE performs BWP switching (e.g., SpCell UL BWP switching), the running BFRQ-SR timer may be stopped by the MAC entity. The UE may start/restart the BFRQ-SR timer after switching to the new BWP.

In some implementations, the BFRQ-SR timer may be configured on a BWP in the SpCell (e.g., one BFRQ-SR timer may be configured on each BWP on the SpCell). In this case, the BFRQ-SR timer on the new BWP is started/restarted.

In some implementations, one BFRQ-SR timer may be configured on the SpCell.

Condition 8: UL Resource being Available for Transmission

In one implementation, the running BFRQ-SR timer may be stopped by the MAC entity if a UL resource is available for transmission of a BFR MAC CE.

In some implementations, the BFR procedure(s) may be performed either based on a cell or a cell group.

In some implementations, the UL resource may be provided by a dynamic grant, a configured UL grant Type 1/Type 2, and/or UL grant in RAR.

In some implementations, the UL resource may be a resource dedicated to the transmission of a BFR MAC CE. In this case, the BS may indicate, via downlink control information (DCI) or RRC signaling, that the corresponding UL resource is for transmission of a BFR MAC CE.

In some implementations, the UL resource is considered available if it can accommodate the BFR MAC CE.

In some implementations, the UL resource is considered available if it can be used for BFR MAC CE.

In some implementations, the UL resource is considered available if it is not allocated on a cell where beam failure is detected or the SR procedure has been triggered and not canceled.

Condition 9: Initiation of RA Procedure

In one implementation, if an RA procedure is initiated on a PCell, PSCell, or SCell, the running BFRQ-SR timer may be stopped.

Preferably, the RA procedure may be triggered by one of the following events: an initial access from RRC_IDLE, a RRC Connection Re-establishment procedure, a DL or UL data arrival during RRC_CONNECTED when UL synchronization status is "non-synchronized", a Ul data arrival during RRC_CONNECTED when there are no PUCCH resources for SR available, a SR failure, a request by RRC upon synchronous reconfiguration (e.g., handover), a transition from RRC_INACTIVE, an establishment of time alignment at SCell addition, a request for other SI, and a beam failure recovery.

Condition 10: MAC Reset

In one implementation, if a reset of the MAC entity is requested by upper layers, the UE may stop the running BFRQ-SR timer.

Condition 11: Release of PUCCH Resource for BFR-SR Transmission

In one implementation, the running BFRQ-SR timer may be stopped by the MAC entity if the PUCCH resource (of the SpCell) for BFR-SR transmission is released by the UE. In one example, a PUCCH resource for BFR-SR transmission may be released if the time alignment timer associated with Primary Timing Advance Group (PTAG) or Secondary Timing Advance Group (STAG) expires.

If the BFRQ-SR timer expires, the UE may perform at least one of the following actions:
1. cancel the triggered BFR procedure(s);
2. cancel the BFR procedure (for SCell);
3. trigger another BFR procedure (e.g., for PCell);
4. initiate an RA procedure (on the SpCell);
5. initiate an RA with pre-configured RA resource/configuration on specific pre-configured serving cell; and
6. deactivate the corresponding SCell(s).

It is noted that the expiry of BFRQ-SR timer may imply that the PHY layer has transmitted one or more BFR-SRs over the period configured by a length of the BFRQ-SR timer, but the UE still does not receive any available UL resource(s) for the transmission of a BFR MAC CE. Hence, the UE may perform an RA procedure to avoid such a deadlock situation.

In one example, the UE may cancel the triggered BFR procedure if the BFRQ-SR timer expires and initiates the RA procedure (e.g., on the SpCell).

In one example, the UE may cancel the triggered BFR procedure if the BFRQ-SR timer expires and triggers another BFR procedure (e.g., on the PCell).

Furthermore, BFR procedure cancellation is disclosed (e.g., cancellation of triggered BFR procedure, cancellation of triggered SR procedure, cancellation of BFRQ-SR timer, etc.) when certain conditions are satisfied. More specifically, the triggered BFR procedure(s) may be canceled if one or more conditions is satisfied:

Condition 1: Transmission of a BFR Report

For cell-based BFR procedure (e.g., a BFR procedure is triggered per cell), if a MAC PDU includes a BFR report (e.g., a BFR MAC CE), and the BFR report (e.g., BFR MAC CE) includes BFR information (e.g., failed cell, candidate beam information corresponding to the serving cell, NBI, measurement result corresponding to the failed cell, etc.) of a certain cell(s), the cell-based BFR procedure that corresponds to this cell(s) may be canceled when this MAC PDU is transmitted. For example, if a MAC PDU includes a BFR report (e.g., BFR MAC CE), and the BFR report (e.g., BFR MAC CE) indicates BFR information of cell #i (e.g., a failed cell index along with the selected candidate beam information of cell #i), the triggered BFR procedure that corresponds to the cell #i is canceled when this MAC PDU is transmitted. On the other hand, if a BFR MAC CE includes a BFR report (e.g., BFR MAC CE), and the BFR report (e.g., BFR MAC CE) indicates BFR information of cell #i and cell #j, the triggered BFR procedure that corresponds to cell #i and the BFR procedure that corresponds to cell #j are canceled when the MAC PDU is transmitted.

For cell-group based BFR procedure, if a MAC PDU includes a BFR report (e.g., BFR MAC CE), and the BFR report (e.g., BFR MAC CE) includes BFR (or BFR report) information (e.g., failed cell/group of cell, candidate beam information corresponding to the serving cell/group of cell, measurement result corresponding to the failed cell/group of cell, etc.) of all the cell(s) in the cell group that triggered the BFR procedure (prior to the MAC PDU assembly), all triggered BFR procedure(s) triggered (prior to the MAC PDU assembly) may be canceled when this MAC PDU is transmitted. For example, if BFR procedure is triggered by a cell with index (i) before the assembly of a MAC PDU that includes a BFR report (e.g., BFR MAC CE), and the BFR report (e.g., BFR MAC CE) indicates BFR information of a cell (i) (e.g., index (i), the candidate beam information corresponding to cell (i), etc.), BFR procedure triggered prior the MAC PDU assembly is canceled when this MAC PDU is transmitted. On the other hand, if BFR procedures are triggered by cell with index (i) and cell with index (j) before the assembly of a MAC PDU that includes a BFR report (e.g., BFR MAC CE), and the BFR report (e.g., BFR MAC CE) only indicates BFR information of a cell (i) (e.g., index (i), the candidate beam information corresponding to cell (i), etc.), BFR procedure triggered prior the MAC PDU assembly is not canceled when this MAC PDU is transmitted. The reason of not canceling the triggered BFR procedure is because the BFR report (e.g., BFR MAC CE) does not report all the SCells that triggered BFR procedures due to the detection of beam failure. Hence, canceling BFR procedure implies that the UE is unable to generate another MAC PDU to report the SCells that have not yet been reported.

The intention of a cell-based BFR procedure may be that a triggered cell-based BFR procedure is canceled if the BFR report (e.g., BFR MAC CE) that includes the information of the corresponding cell is transmitted. For example, if cell-based BFR procedure corresponding to cell #1 and cell #2 is triggered due to BFD on the cell #1 and cell #2. Consequently, if a BFR report (e.g., BFR MAC CE) includes information of only the cell #1 is transmitted, only the BFR procedure corresponding to the cell #1 may be canceled. On the other hand, if a BFR report (e.g., BFR MAC CE) includes information of both cell #1 and cell #2. The BFR procedures corresponding to both cell #1 and #2 can both be canceled. Hence, cell-based BFR procedure may be applied to any BFR MAC CE format.

On the other hand, the intention of a cell-group based BFR procedure may be that a triggered cell group-based BFR procedure is canceled if the BFR report (e.g., BFR MAC CE) that includes the information of the corresponding cell group (of multiple cells) is transmitted. For example, if BFR procedure corresponding to cell group #1 (including cell #1 and cell #2) is triggered due to BFD on the cell #1 or cell #2. Consequently, if a BFR report (e.g., BFR MAC CE) including BFR information of cell #1 is transmitted, the BFR procedure corresponding to cell group #1 may not be cancelled because this BFR MAC CE does not include the information of the cell #2 (which also belongs to cell group #1). Hence, cell-group based BFR procedure may also be applied to any BFR MAC CE format.

Condition 2: Reconfiguration of BFR Related Parameter(s) Configured in SCell(s)

In some implementations, if parameter(s) for BFR configured in SCell(s) is reconfigured, the triggered BFR procedure(s) may be canceled by the MAC entity.

In some implementations, the triggered BFR procedure may be cell-based or cell-group based.

In some implementations, if BFR related parameter(s) configured in SCell(s) is reconfigured, the BFR procedure(s) triggered by the same cell that this BFR related parameter (s) corresponds to (e.g., if a BFR related parameter is configured for cell #i (cell #i may be an SCell), it is corresponding to cell #i; if a BFR related parameter is configured for a cell group which includes cell #i and cell #j (cell #i and cell #j may be two different SCells), it is corresponding to cell #i and cell #j) may be canceled.

In some implementations, if BFR related parameter(s) corresponding to a specific SCell is reconfigured, the generated BFR MAC CE may not include the BFR information of this SCell (e.g., index of the cell, the candidate beam information corresponding cell).

The BFR related parameter(s) configured in SCell(s) may include at least one parameter associated with NBI RS(s) configured in SCell(s), BFD RS(s) configured in SCell(s), BFR CORSET configuration(s) configured in SCell(s), and parameters for beam failure detection that are configured in SCell(s), where the parameters for beam failure detection may include "beamFailureDetectionTimer" and "beamFailureInstanceMaxCount".

Condition 3: Reconfiguration of BFR Related Parameter(s) Configured in SpCell

In some implementations, if parameter(s) for BFR (for SCell) configured in SpCell is reconfigured, all the triggered BFR procedure(s) may be canceled by the MAC entity.

In some implementations, the BFR procedure may be a cell-based or cell-group based BFR procedure.

The BFR related parameter(s) configured in a SpCell may include at least one parameter associated with a BFRQ-SR timer, BFR CORESET configuration configured on the SpCell, and PUCCH resource(s) for BFR-SR transmission (e.g., PUCCH resource(s), configured on the SpCell, on a per BWP basis for the BFR-SR transmission).

Condition 4: Triggering of RACH-Based BFR Procedure

In some implementations, if a BFR procedure is triggered at the SpCell, all the triggered BFR procedure may be canceled by the MAC entity.

In some implementations, the BFR procedure may be a cell-based or cell-group based BFR procedure.

In some implementations, RACH-based BFR procedure is triggered if the number of beam failure instances of the SpCell is equal to or above a maximum number configured for the SpCell. The BFR procedure triggered at the SpCell may refer to an RA procedure.

The RACH-based BFR procedure may be performed based on a contention free RA procedure and/or a contention-based RA procedure. The RACH-based BFR procedure is triggered when the corresponding RA procedure is initiated. The RACH-based BFR procedure is ongoing when the corresponding RA procedure is ongoing. The RACH-based BFR procedure is stopped when the corresponding RA procedure is stopped. The RACH-based BFR procedure is completed when the corresponding RA procedure is completed.

Condition 5: Deactivation of SCell

In some implementations, if an SCell is deactivated, the triggered BFR procedure(s) may be canceled by the MAC entity.

In some implementations, the triggered BFR procedure may be either cell-based or cell group-based.

In some implementations, if a specific SCell is deactivated, the BFR procedure which has been triggered by this cell may be canceled.

In some implementations, if a specific SCell is deactivated, the generated BFR MAC CE may not include the BFR information of this cell (e.g., index of the cell, the candidate beam information corresponding cell, etc.)

In some implementations, the SCell may be deactivated upon reception of an SCell activation/deactivation MAC CE for deactivating the SCell.

In some implementations, the SCell may be deactivated when an SCell deactivation timer associated with the activated SCell expires.

In some implementations, the SCell may be an activated SCell(s) that triggers the BFR procedure and/or is used to transmit the BFR MAC CE.

Condition 6: BWP Switch/Deactivation

In some implementations, if the UE performs BWP switching (on SpCell, SCell, and/or a serving cell which detects beam failure), all the triggered BFR procedure(s) may be canceled.

In some implementations, the triggered BFR procedure may be a cell-based or cell-group based BFR procedure.

In some implementations, the BWP may be an active UL and/or DL BWP. The BWP may be a BWP which is used to transmit the BFR-SR. The corresponding BWP may be a BWP which is used to transmit the BFR MAC CE.

Preferably, the BWP may be switched/deactivated by PDCCH indicating a DL assignment or a UL grant, by the "bwp-InactivityTimer", by RRC signaling, or by the MAC entity itself upon initiation of RA procedure. The BWP is switched means the BWP switching for a cell is used to activate an inactive BWP and deactivate an active BWP at a time.

Condition 7: UL Resource being Available for Transmission

In some implementations, all triggered BFR procedure(s) may be canceled by the MAC entity if a UL resource is available for transmission of a BFR MAC CE.

In some implementations, the BFR procedure(s) may be either cell-based, or cell group-based.

In some implementations, the UL resource may be provided by a dynamic grant, a configured UL grant Type 1/Type 2, and/or UL grant in RAR.

In some implementations, the UL resource may be a resource dedicated to the transmission of a BFR MAC CE. In this case, the BS may indicate, via DCI or RRC signaling, that the corresponding UL resource is for transmission of a BFR MAC CE.

In some implementations, the UL resource is available for transmission means that the UL resource can accommodate the BFR MAC CE with its subheader.

In some implementations, the UL resource is available for transmission means that the UL resource may be used for BFR MAC CE based on some restrictions. More specifically, the BFR MAC CE may be transmitted only on a specific UL resource (e.g., the specific UL resource implicitly or explicitly indicates a specific information). If the received UL resource indicates the specific information, the UL resource may be allowed to be used for BFR MAC CE.

In some implementations, the UL resource is available for transmission means that the UL resource is allocated on a cell where beam failure has not been detected/BFR procedure has not been triggered and canceled.

More specifically, the UL resource may be scheduled by a dynamic grant via a DCI, wherein the DCI may include a cell information (e.g., cell index, carrier indicator, etc.)

More specifically, the UL resource may be a configured UL resource, wherein the configured UL resource may be configured on a cell where beam failure has been detected/BFR procedure has not been triggered and canceled.

More specifically, the UL resource may be cross-cell scheduled. For example, the DCI/PDCCH which is received on a first cell, and the UL resource (e.g., PUSCH resource) is scheduled on the cell where beam failure has been detected/BFR procedure has not been triggered and canceled.

More specifically, the UL resource may be provided by a dynamic grant, configured grant, and/or UL grant in RAR.

Condition 8: Initiation of RA Procedure

In some implementations, if the UE initiates an RA procedure (e.g., on SpCell, SCell, and/or the cell which detects beam failure), all the BFR procedure(s) may be canceled by the MAC entity. In one example, if the UE initiates the RA procedure in the first CG, all the BFR procedure(s) triggered in the first CG may be canceled. On the other hand, if the UE initiates the RA procedure in the second CG, all the BFR procedure(s) triggered in the second CG may be canceled. In one example, the UE in dual connectivity (DC) mode may be configured with two or more CGs. If the UE initiates the RA procedure in the first CG, all the triggered BFR procedure(s), regardless of the CG that triggers the BFR procedure, may be canceled.

Preferably, the RA procedure may be initiated by one of the following events: an initial access from RRC_IDLE, a RRC Connection Re-establishment procedure, a DL or UL data arrival during RRC_CONNECTED when UL synchronization status is "non-synchronized", UL data arrival during RRC_CONNECTED when there are no PUCCH resources for SR available, a SR failure, a request by RRC upon synchronous reconfiguration (e.g., handover), a transition from RRC_INACTIVE, an establishment of time alignment at SCell addition, a request for other SI, or a beam failure recovery.

In one example, if the RA procedure on the SCell is initiated, all the triggered BFR procedure of the SCell may be canceled.

Condition 9: Expiration of BFRQ-SR Timer

In some implementations, if the BFRQ-SR timer expires, the MAC entity may perform RA procedure upon expiration of the BFRQ-SR timer, and cancel all the triggered BFR procedure(s).

In some implementations, the triggered BFR procedure may be cell-based or cell group-based.

Condition 10: The Corresponding BFR Procedure (for SCell) being Determined Complete In some implementations, if a beam failure is detected on an SCell(s), the UE may trigger a BFR procedure for the SCell(s). The UE may trigger a BFR procedure during the BFR procedure for the SCell(s). If the BFR procedure for the SCell(s) is determined complete, the triggered BFR procedure may be canceled.

Preferably, when the UE receives the BFR response, the UE may determine the corresponding BFR procedure is completed.

Preferably, when the UE has (successfully) transmitted the BFR report (e.g., BFR MAC CE), the UE may determine the corresponding BFR procedure is completed.

Preferably, when the UE receives an indication, to change/update the serving beam(s) of the SCell(s), the UE may determine the BFR procedure for the SCell(s) as completed. The indication may be transmitted via a MAC CE or RRC signaling. The serving beam for the UE means a beam generated by a NW (e.g. TRP) that communicates with the UE.

In some implementations, the UE may determine the BFR procedure for the SCell(s) as completed if the MAC CE indicates the change of serving beam (e.g., change of TCI state ID) of the PDCCH/PDSCH that corresponds to a cell.

In some implementations, the UE may determine the BFR procedure for the SCell(s) as completed if the MAC CE indicates the change of serving beam (e.g., change of TCI state ID) of the PDCCH/PDSCH that corresponds to a specific cell/subset of a cell group/cell group. The specific cell/subset of a cell group may be referred to the cell/subset of a cell group that is included in the BFR MAC CE, the cell/subset of a cell group where the (SCell) beam failure is detected, the cell/subset of a cell group where the SR procedure/BFR procedure is triggered.

In some implementations, the UE may determine the BFR procedure as completed if the RRC signaling reconfigures the set of serving beams (e.g., set of TCI state IDs) of a PDCCH/PDSCH that corresponds to a cell.

In some implementations, the UE may determine the BFR procedure as completed if the RRC signaling reconfigures the set of serving beams (e.g., set of TCI state IDs) of a PDCCH/PDSCH which corresponds to a specific cell/subset of a cell group/cell group. The specific cell/subset of a cell group may be referred to the cell/subset of a cell group that is included in the BFR MAC CE, the cell/subset of a cell group where the (SCell) beam failure is detected, the cell/subset of a cell group where the SR procedure/BFR procedure is triggered.

In some implementations, the UE may determine the BFR procedure for the SCell(s) as completed if the MAC CE indicates the change of serving beam (e.g., change of TCI state ID) of the PDCCH/PDSCH which corresponds to a serving beam indicated in the BFR MAC CE.

In some implementations, the UE may determine the BFR procedure for the SCell(s) as completed if the UE successfully monitors/receives/decodes the PDCCH/PDSCH after the BFR procedure has been triggered.

Condition 11: Change of Serving Beam

In some implementations, an indication (e.g., an indication of TCI state for a UE-specific PDCCH MAC CE, activation/deactivation of a UE-specific PDSCH MAC CE) indicates the change of serving beam (e.g., change of TCI state ID) of the PDCCH/PDSCH that corresponds to a cell.

In some implementations, an indication (e.g., an indication of TCI state for a UE-specific PDCCH MAC CE, activation/deactivation of a UE-specific PDSCH MAC CE) indicates the change of serving beam (e.g., change of TCI state ID) of the PDCCH/PDSCH that corresponds to a specific cell/subset of a cell group/cell group. The specific cell/subset of a cell group may be referred to the cell/subset of a cell group that is included in the BFR MAC CE, the cell/subset of a cell group where the (SCell) beam failure is detected, the cell/subset of a cell group where the SR procedure/BFR procedure is triggered.

In some implementations, the RRC signaling reconfigures the set of serving beams (e.g., set of TCI state IDs) of a PDCCH/PDSCH that corresponds to a cell.

In some implementations, the RRC signaling reconfigures the set of serving beams (e.g., set of TCI state IDs) of a PDCCH/PDSCH that corresponds to a specific cell/subset of a cell group/cell group. The specific cell/subset of a cell group may be referred to the cell/subset of a cell group that is included in the BFR MAC CE, the cell/subset of a cell group where the (SCell) beam failure is detected, the cell/subset of a cell group where the SR procedure/BFR procedure is triggered.

In some implementations, an indication (e.g., an indication of TCI state for a UE-specific PDCCH MAC CE, activation/deactivation of a UE-specific PDSCH MAC CE) indicates the change of serving beam (e.g., change of TCI state ID) of the PDCCH/PDSCH that corresponds to a serving beam indicated in the BFR MAC CE.

Condition 12: The Corresponding BFR Procedure (for SCell) being Cancelled/Stopped/Suspended/Failed In some implementations, if beam failure is detected on an SCell(s), the UE may trigger a BFR procedure for the SCell(s). The UE may trigger a BFR procedure during the BFR procedure for the SCell(s). If the BFR procedure for the SCell(s) is canceled/stopped/suspended/failed, the triggered BFR procedure may be canceled by the MAC entity.

Condition 13: MAC Reset

In some implementations, if a reset of the MAC entity is requested by an upper layer, the UE may cancel all the triggered BFR procedure(s).

Condition 14: Release of PUCCH Resource

In some implementations, the triggered BFR procedure may be canceled by the MAC entity if the PUCCH resource (of the SpCell) is released by the UE. In one example, the PUCCH resource may be released if the time alignment timer associated with PTAG/STAG expires.

Condition 15: Successful Transmission of a BFR Report

For cell-based BFR procedure (e.g., a BFR procedure that is triggered per cell), if a MAC PDU includes a BFR report (e.g., a BFR MAC CE), and the BFR report (e.g., BFR MAC CE) includes BFR information (e.g., failed cell, candidate beam information corresponding to the serving cell, NBI, measurement result corresponding to the failed cell, etc.) of certain cell(s), the cell-based BFR procedure that corresponds to this cell(s) may be canceled when this MAC PDU is successfully transmitted. Furthermore, this MAC PDU is considered as successfully transmitted when the UE receives a BFR response from the network. In one implementation, the BFR response may be a PDCCH (addressed to C-RNTI indicating a UL grant for a new transmission for the HARQ process used for the transmission of the MAC PDU/BFR report). For example, if a MAC PDU includes a BFR report (e.g., BFR MAC CE), and the BFR report (e.g., BFR MAC CE) indicates BFR information of cell #i (e.g., a failed cell index along with the selected candidate beam information of cell #i), the triggered BFR procedure that corresponds to the cell #i is canceled when this MAC PDU is successfully transmitted. That is, when the UE receives a BFR response from the network for the transmitted MAC PDU/BFR report. On the other hand, if a BFR MAC PDU includes a BFR report (e.g., BFR MAC CE), and the BFR report (e.g., BFR MAC CE) indicates BFR information of cell #i and cell #j, the triggered BFR procedure that corresponds to cell #i and the BFR procedure that corresponds to cell #j are canceled when the MAC PDU is successfully transmitted. That is, the UE receives a BFR response corresponding to the transmitted BFR MAC PDU/BFR report, from the network.

The "BFI_COUNTER" configured for the BFR procedure may be set to '0' (or reset) if one or more combinations of the following conditions is satisfied:

Condition 1: Triggering of a BFR Procedure

In one implementation, the "BFI_COUNTER" used in a specific SCell may be set to '0' if the BFR procedure of the specific SCell is triggered. The BFR procedure may be a cell-based or a cell-group based BFR procedure.

Condition 2: Reconfiguration of SCell BFR Related Parameter(s)

In one implementation, if SCell BFR related parameter(s) configured for a specific cell is reconfigured by RRC, the "BFI_COUNTER" configured in the specific cell may be set to '0'. The SCell BFR related parameter may include parameters associated with NBI RS(s) configured in SCell, BFD RS(s) configured in SCell, SCell beam failure detection parameters configured in SCell. The parameters for the SCell beam failure detection may include "beamFailureDetectionTimer" and "beamFailureInstanceMaxCount".

Condition 3: Deactivation of SCell

In one implementation, if a specific SCell is deactivated, the "BFI_COUNTER" used in the SCell may be set to '0'. The "BFI_COUNTER" is used according to a serving cell.

In some implementations, if all SCells of a group of multiple serving cells are deactivated, the "BFI_COUNTER" used in that group of serving cells may be set to '0'. The "BFI_COUNTER" is used according to a group of serving cells.

Condition 4: Activation of SCell

In one implementation, if a specific SCell is activated, the "BFI_COUNTER" used in the SCell may be set to '0'. The "BFI_COUNTER" is used according to a serving cell.

In some implementations, if all SCells of a group of multiple serving cells are activated, the "BFI_COUNTER" used in that group of serving cells may be set to '0'. The "BFI_COUNTER" is used according to a group of serving cells.

Condition 5: MAC Reset

In one implementation, if a reset of the MAC entity is requested by an upper layer, the UE may reset the "BFI_COUNTER".

After triggering a BFR procedure (for a serving cell), the UE may trigger a SR procedure (for the serving cell) if one or more combinations of the following conditions is satisfied:

1. a beam failure (for the serving cell) has been detected;
2. a BFR procedure (for the serving cell) has been triggered;
3. no UL resource allocated for transmission of a BFR report;
4. the UE has UL resources allocated for a new transmission, but the UL resource cannot accommodate a BFR report (e.g., BFR MAC CE);
5. the UE has UL resources allocated for a new transmission, but the UL resource is not allowed to be used for transmission of a BFR report (e.g., BFR MAC CE);
6. no other BFR procedure is ongoing;
7. no other SR procedure is pending;
8. no other SR procedure associated with the same BFR-SR configuration is pending;
9. the UE has valid PUCCH resource for the BFR-SR transmission; and
10. no BFRQ-SR timer is running.

When a SR procedure is triggered, the UE may determine the SR procedure as pending. When the SR procedure is pending, the UE may keep signaling the BFR-SR on a valid PUCCH resource for the BFR-SR to request UL resource(s).

Furthermore, SR procedure cancellation is disclosed. The triggered SR procedure may be canceled if one or more combinations of the following conditions is satisfied:

Condition 1: A UL Resource being Available for Transmission

If there is an available UL resource, but the BFR MAC CE is not able to be included in the UL resource (e.g., based on a logical channel prioritization (LCP) procedure), the UE may need to further request more UL resource to accommodate the BFR MAC CE (e.g., a larger size UL resource). Thus, the UE may need to determine whether to cancel the SR procedure based on whether the UL resource could accommodate the BFR MAC CE.

In one example, all triggered SR procedure(s) (from one or multiple serving cells) may be canceled if the UE has UL resources allocated for a new transmission, and the UL resource can accommodate the BFR MAC CE.

Preferably, the UL resource may be provided by a dynamic grant (e.g., PDCCH), a configured UL grant type 1/type 2, and/or UL grant in RAR.

More specifically, when the UE performs a new transmission, the LCP procedure may be applied. Then, the UE may generate a MAC PDU by including MAC CEs and/or data based on a priority. The available UL resource accommodating the BFR MAC CE may mean that the MAC PDU includes the BFR MAC CE.

In some implementations, the UE may be configured with one or more LCP restrictions for using the UL resource (e.g., allowedSCS-List, maxPUSCH-Duration, configuredGrantType1Allowed, allowedServingCells). When the LCP procedure is applied for a new transmission, the MAC CEs and/or data may be restricted to use the UL resource.

In some implementations, if the UL resource is conformed with the requirement of BFR MAC CE (e.g., if the PUSCH duration (maxPUSCH-Duration) of the UL resource is lower than a threshold), the UE may use this UL resource for transmitting BFR MAC CE.

More specifically, the BFR MAC CE may be transmitted only on a specific UL resource (e.g., the specific UL resource implicitly or explicitly indicates specific information). If the received UL resource indicates the specific information, the UL resource may be allowed to be used for the BFR MAC CE.

The UE may be allocated with UL resource for a new transmission. However, the UL resource may be allocated on a cell where beam failure has been detected.

More specifically, the UL resource may be scheduled by a dynamic grant via a DCI, where the DCI may include cell information (e.g., cell index, carrier indicator).

More specifically, the UL resource may be a configured UL resource, where the configured UL resource may be configured on a cell where beam failure has been detected.

More specifically, the UL resource may be cross-cell scheduled. For example, the DCI/PDCCH which is received on a first cell, and the UL resource (e.g., PUSCH resource) is scheduled on the cell where beam failure has been detected.

Condition 2: Transmission of a BFR Report

In some implementations, if a MAC PDU includes a BFR report (e.g., a BFR MAC CE), and the BFR report (e.g., the BFR MAC CE) includes BFR information of a serving cell (e.g., the failed cell index of the serving cell along with the selected candidate beam information of the serving cell), the SR procedure triggered by the serving cell may be canceled when this MAC PDU is transmitted. In some implementations, if a MAC PDU includes a BFR report (e.g., a BFR MAC CE) of certain serving cells, and the BFR report includes BFR information of those serving cells (e.g., for each of those failed serving cells, the failed cell index of the serving cell along with the selected candidate beam information of the serving cell may be included), the SR procedures triggered by those serving cells may be cancelled when this MAC PDU is transmitted. Preferably, the BFR report (e.g., BFR MAC CE) may include (failed) CC (or cell) information (e.g., cell index), (failed) set/group(s) of cells (e.g., the set/group may be pre-configured by a NW), (failed) TRP information, the corresponding measurement result (e.g., RSRP, SINR) of the (failed) CC, set/group of cells, TRP, candidate beam information (or new beam information), e.g., one or more qualified beam based on measuring NBI RS, and/or No new beam information (e.g., if there is no new beam with RSRP higher than a threshold for the (failed) CC, set/group of cells, TRP).

In some implementations, if a MAC PDU includes a BFR report (e.g., BFR MAC CE), and the BFR report (e.g., BFR MAC CE) includes BFR information (e.g., failed cell, candidate beam information corresponding to the serving cell, measurement result corresponding to the failed cell, etc.) of all the cell(s) in the cell group that triggered the SR procedure(s) prior to the MAC PDU assembly, all the triggered SR procedure(s) prior to the MAC PDU assembly may be canceled when this MAC PDU is transmitted.

Condition 3: Triggering of RACH-Based BFR Procedure

Since the BFR-SR may be signaled on the PUCCH resource (of PCell or PSCell) for BFR-SR transmission, if a RACH-based BFR procedure is triggered, it may imply that the DL and/or UL transmission on PCell or PSCell is not qualified, so the UE may not need to keep transmitting BFR-SR in this situation.

In some implementations, if the BFR procedure is triggered at the SpCell, (all) the triggered SR procedure(s) may be canceled by the UE.

Preferably, the RACH-based BFR procedure may be triggered if the number of beam failure instance indications of the SpCell is equal to or above a maximum number configured for the SpCell.

Preferably, the RACH-based BFR procedure (i.e., an RA procedure) may be triggered at the SpCell.

Condition 4: Initiation of RA Procedure

In some implementations, if an RA procedure is initiated on a cell, the (all) triggered SR procedure may be canceled by the UE. The cell may be a PCell, PSCell, or SCell.

Preferably, the RA procedure may be triggered by one of the following events: an initial access from RRC_IDLE, a RRC Connection Re-establishment procedure, DL or UL data arrival during RRC_CONNECTED when UL synchronization status is "non-synchronized, UL data arrival during RRC_CONNECTED when there are no PUCCH resources for SR available, a SR failure, a request by RRC upon synchronous reconfiguration (e.g. handover), a transition from RRC_INACTIVE, an establishment of time alignment at SCell addition, a request for Other SI, and a beam failure recovery.

Condition 5: The Corresponding BWP being Switched/Deactivated

In some implementations, the UE transmits the BFR-SR on a PUCCH resource for BFR-SR transmission, and the PUCCH resource is configured on a BWP. If the UE switches/deactivated the BWP to another BWP, the UE may cancel (all) the SR procedure.

In some implementations, The UE transmits the BFR-SR on a PUCCH resource for BFR-SR transmission, and the PUCCH resource is configured on a BWP. If the UE switches/deactivated the BWP to another BWP, the UE may transmit the BFR-SR on another PUCCH resource for BFR-SR transmission, which is configured on another BWP.

Preferably, the corresponding BWP may be an active UL and/or DL BWP. The corresponding BWP may be a BWP that is used to transmit the BFR-SR or BFR MAC CE.

Preferably, the corresponding BWP may be switched/deactivated by PDCCH indicating a DL assignment or a UL grant, by the bwp-InactivityTimer, by RRC signaling, or by the MAC entity itself upon initiation of an RA procedure. The corresponding BWP switched for a Serving Cell is used to activate an inactive BWP and deactivate an active BWP at a time.

Condition 6: The Corresponding SCell(s) being Deactivated

In some implementations, if beam failure is detected on an SCell(s), the UE may trigger SR procedure for the SCell(s) for transmitting the BFR report (e.g., BFR MAC CE). However, if the SCell(s) is deactivated, the UE may not need to recover the beam failure of the SCell(s). Therefore, the UE may cancel the SR procedure for the SCell(s) when the corresponding SCell(s) is deactivated.

Preferably, the corresponding SCell(s) may be an activated SCell(s) which triggers the BFR procedure. The corresponding SCell(s) may be an activated SCell(s) that is used to transmit the BFR-SR or the BFR MAC CE.

Preferably, the corresponding SCell(s) may be deactivated by a NW (e.g., based on SCell activation/deactivation MAC CE) or by the UE itself (e.g., based on an SCell deactivation timer).

Condition 7: The Corresponding BFR Procedure being Determined Complete

In some implementations, if a beam failure is detected on an SCell(s), the UE may trigger a BFR procedure for the SCell(s). Subsequently, the UE may trigger a SR procedure for the SCell(s). If the BFR procedure for the SCell(s) is determined complete, the triggered SR procedures may be canceled.

Preferably, when the UE receives the BFR response, the UE may determine the corresponding BFR procedure is completed.

Preferably, when the UE has transmitted the BFR MAC CE, the UE may determine the corresponding BFR procedure is completed.

Preferably, when the UE receives an indication to change/update the serving beam(s) of the SCell(s), the UE may determine the BFR procedure for the SCell(s) is completed.

Preferably, when the UE receives an indication, to change/update the serving beam(s) of the SCell(s), the UE may determine the BFR procedure for the SCell(s) as completed. The indication may be signaled via a MAC CE or RRC signaling.

In some implementations, the UE may determine the BFR procedure for the SCell(s) as completed if an indication (e.g., an indication of TCI state for a UE-specific PDCCH MAC CE, activation/deactivation of a UE-specific PDSCH MAC CE) indicates the change of serving beam (e.g., change of TCI State ID) of the PDCCH/PDSCH which corresponds to a cell.

In some implementations, the UE may determine the BFR procedure for the SCell(s) as completed if an indication (e.g., an indication of TCI state for a UE-specific PDCCH MAC CE, activation/deactivation of a UE-specific PDSCH MAC CE) indicates the change of serving beam (e.g., change of TCI state ID) of the PDCCH/PDSCH which corresponds to a specific cell/subset of a cell group/cell group. The specific cell/subset of a cell group may be referred to the cell/subset of a cell group which is included in the BFR MAC CE, the cell/subset of a cell group where the (SCell) beam failure is detected, the cell/subset of a cell group where the SR procedure/BFR procedure is triggered.

In some implementations, the UE may determine the BFR procedure as completed if the RRC signaling reconfigures the set of serving beams (e.g., set of TCI state IDs) of a PDCCH/PDSCH that corresponds to a cell.

In some implementations, the UE may determine the BFR procedure as completed if the RRC signaling reconfigures the set of serving beams (e.g., set of TCI state IDs) of a PDCCH/PDSCH which corresponds to a specific cell/subset of a cell group/cell group. The specific cell/subset of a cell group may be referred to the cell/subset of a cell group which is included in the BFR MAC CE, the cell/subset of a cell group where the (SCell) beam failure is detected, the cell/subset of a cell group where the SR procedure/BFR procedure is triggered.

In some implementations, the UE may determine the BFR procedure for the SCell(s) as completed if an indication (e.g., an indication of TCI state for a UE-specific PDCCH MAC CE, activation/deactivation of a UE-specific PDSCH MAC CE) indicates the change of serving beam (e.g., change of TCI state ID) of the PDCCH/PDSCH which corresponds to a serving beam indicated in the BFR MAC CE.

In some implementations, the UE may determine the BFR procedure for the SCell(s) as completed if the UE successfully monitors/receives/decodes the PDCCH/PDSCH after a (SCell) BFR procedure has been triggered.

Condition 8: Change of Serving Beam

In some implementations, an indication (e.g., an indication of TCI state for a UE-specific PDCCH MAC CE, activation/deactivation of a UE-specific PDSCH MAC CE) indicates the change of serving beam (e.g., change of TCI State ID) of the PDCCH/PDSCH that corresponds to a cell.

In some implementations, an indication (e.g., an indication of TCI state for a UE-specific PDCCH MAC CE, activation/deactivation of a UE-specific PDSCH MAC CE) indicates the change of serving beam (e.g., change of TCI state ID) of the PDCCH/PDSCH that corresponds to a specific cell/subset of a cell group/cell group. The specific cell/subset of a cell group may be referred to the cell/subset of a cell group which is included in the BFR MAC CE, the cell/subset of a cell group where the (SCell) beam failure is detected, the cell/subset of a cell group where the SR procedure/BFR procedure is triggered.

In some implementations, the RRC signaling reconfigures the set of serving beams (e.g., set of TCI state IDs) of a PDCCH/PDSCH which corresponds to a cell.

In some implementations, the RRC signaling reconfigures the set of serving beams (e.g., set of TCI state IDs) of a PDCCH/PDSCH which corresponds to a specific cell/subset of a cell group/cell group. The specific cell/subset of a cell group may be referred to the cell/subset of a cell group which is included in the BFR MAC CE, the cell/subset of a cell group where the (SCell) beam failure is detected, the cell/subset of a cell group where the SR procedure/BFR procedure is triggered.

In some implementations, an indication (e.g., an indication of TCI state for a UE-specific PDCCH MAC CE, activation/deactivation of a UE-specific PDSCH MAC CE) indicates the change of serving beam (e.g., change of TCI state ID) of the PDCCH/PDSCH which corresponds to a serving beam indicated in the BFR MAC CE.

Condition 9: The Corresponding BFR Procedure (for SCell) being Canceled/Stopped/Suspended/Failed In some implementations, if a beam failure is detected on an SCell(s), the UE may trigger a BFR procedure for the SCell(s). The UE may trigger a SR procedure for the SCell(s). If the BFR procedure for the SCell(s) is canceled/stopped/suspended/failed due to some reasons, the SR procedure for the SCell(s) may be canceled.

Condition 10: Reconfiguration of BFR Related Parameter(s)

In some implementations, the UE may cancel the SR procedure when a BFR related parameters is reconfigured.

Preferably, the BFR related parameter(s) may be any configuration of the BFR configuration (for SCell) (e.g., a counter, timer).

Preferably, the BFR related parameter(s) may be the corresponding UL resource for BFR-SR, BFD RS and/or NBI RS.

Condition 11: No PUCCH Resource Available for the Transmission of a BFR-SR

In some implementations, the PUCCH resource for BFR-SR transmission may not be configured in the current UL BWP of the PCell. In this case, the UE may cancel (all) the triggered SR procedure(s) and perform subsequent action(s) (e.g., initiate RA, trigger RACH-based BFR procedure).

In some implementations, the PUCCH resource for BFR-SR transmission may be released due to the expiration of the configured timeAlignmentTimer.

Condition 12: The Number of BFR-SR Transmissions Reaching to a Configured Maximum Value In some implementations, if the number of BFR-SR transmissions reaches or exceeds a configured maximum number, the UE may cancel (all) the triggered SR procedure(s) and perform subsequent action(s) (e.g., initiate RA, trigger RACH-based BFR procedure).

Condition 13: MAC Reset

In some implementations, if a reset of the MAC entity is requested by upper layers, the UE may cancel all the triggered SR procedure(s).

Condition 14: Release of PUCCH Resource

In some implementations, the triggered BFRQ-SR(s) may be canceled by the MAC entity if the PUCCH resource (of the SpCell) is released by the UE. In one example, a PUCCH resource may be released if the time alignment timer associated with PTAG/STAG expires.

On the other hand, BFR-SR transmission restriction is disclosed.

It is noted that while using the "SR procedure triggering" approach to perform SCell BFR procedure mentioned above, a triggered SR procedure may be considered as pending until it is canceled. When at least one triggered SR procedure is pending, the UE may keep signaling the BFR-SR on valid PUCCH resource for BFR-SR transmission since the UE may not successfully get available UL resource for BFR report by only attempting BFR-SR transmission a few times. It is noted that only the PUCCH resource on a BWP which is active at the time of BFR-SR transmission occasion may be considered valid.

In one implementation, the PHY layer may keep signaling the BFR-SR on valid PUCCH resource for BFR-SR transmission after being instructed by MAC since the UE may not successfully get available UL resource for BFR report by only attempting BFR-SR transmission a few times. It is noted that only the PUCCH resource on a BWP that is active at the time of BFR-SR transmission occasion may be considered valid.

However, it is possible that the radio quality between the UE and NW is poor, the UE may fail to transmit the BFR-SR for a period of time. For example, the UE may transmit the BFR-SR for several times, but the UE still does not receive any available UL resource(s). It's not conducive to transmit the BFR-SR without limitation. Accordingly, some mechanisms may be needed to restrict the BFR-SR transmission. One or more or any combination of the following disclosed alternatives are available.

Alternative 1: Timer-Based

A specific timer (which is referred to BFR-SR timer in this document) may be used to control the BFR-SR transmission. For example, when the BFR-SR timer is running, the UE could transmit the BFR-SR on a valid PUCCH resource for BFR-SR. When the BFR-SR timer is not running, the UE could not transmit the BFR-SR (even if the BFR-SR is pending). When the BFR-SR timer is running, the corresponding BFR-SR may be considered as pending. When the BFR-SR timer expires, the corresponding BFR-SR, BFRQ confirmation, and/or BFR procedure may be canceled.

The BFR-SR timer may be started or restarted when one or multiple of the following conditions is satisfied:

Condition 1. the corresponding SR procedure is triggered.
Condition 2. the corresponding BFR procedure (for SCell) is triggered.
Condition 3. the corresponding beam failure (for SCell) is detected.
Condition 4. the corresponding BWP is switched/deactivated.
Condition 5. upon the MAC entity instructs PHY for BFR-SR transmission.

In addition, the BFR-SR timer may be stopped when one or more following conditions is satisfied:

Condition 1. the corresponding triggered SR procedure is canceled.
Condition 2. the corresponding BFR procedure (for SCell) is canceled.
Condition 3. the corresponding BFR procedure (for SCell) is completed.
Condition 4. the corresponding BFR-SR configuration is reconfigured.
Condition 5. any configuration of the BFR configuration (for SCell) is reconfigured (e.g., a counter, timer).
Condition 6. the corresponding UL resource for BFR-SR, BFD RS and/or NBI RS is reconfigured.
Condition 7. another BFR procedure (for SpCell or SCell) is triggered.
Condition 8. the corresponding SCell(s) is deactivated.
Condition 9. transmission of a MAC PDU that includes a BFR report (e.g., BFR MAC CE).
Condition 10. transmission of a MAC PDU that includes a BFR report (e.g., BFR MAC CE) which includes all the SCells which detect BFR prior to the MAC PDU assembly.
Condition 11. cancellation of BFR procedure.
Condition 12. the corresponding BWP is switched/deactivated or a UL resource becomes available for the transmission of a BFR report (e.g., BFR MAC CE).

In addition, when the BFR-SR timer expires, the UE may perform one or more the following actions:

Action 1. cancel the corresponding SR procedure (e.g., pending SR procedure).
Action 2. cancel the BFR procedure (for SCell).
Action 3. trigger another BFR procedure (e.g., for PCell).
Action 4. initiate an RA procedure (on the SpCell).
Action 5. deactivate the corresponding SCell(s).

Action 6. when the UE deactivates the corresponding SCell(s), the UE may send an indication (e.g., a MAC CE) to NW to inform this condition.

Another specific timer ("a BFR-SR prohibit timer") may be used to control the BFR-SR transmission in an opposite way. For example, when the BFR-SR prohibit timer is running, the UE could not transmit the BFR-SR on a valid PUCCH resource for BFR-SR (even the BFR-SR is pending). When the BFR-SR prohibit timer is not running, the UE could transmit the BFR-SR.

The BFR-SR prohibit timer may be started or restarted when the corresponding BFR-SR is signaled and/or when the BFR-SR prohibit timer is not running at the time the BFR-SR is signaled.

Moreover, The BFR-SR prohibit timer may be stopped when one or more following conditions is satisfied:

Condition 1. the corresponding BFR procedure (for SCell) is canceled.
Condition 2. the corresponding BFR procedure (for SCell) is completed.
Condition 3. the corresponding BFR-SR configuration is reconfigured.
Condition 4. any configuration of the BFR configuration (for SCell) is reconfigured (e.g., counter, timer).
Condition 5. the corresponding UL resource for BFR-SR, BFD RS and/or NBI RS is reconfigured.
Condition 6. another BFR procedure (for SpCell or SCell) is triggered.
Condition 7. the corresponding BWP is switched/deactivated.
Condition 8. the corresponding SCell(s) is deactivated.
Condition 9. transmission of a MAC PDU that includes a BFR report (e.g., BFR MAC CE).
Condition 10. transmission of a MAC PDU that includes a BFR report (e.g., BFR MAC CE) that includes all the SCells which detects BFR prior to the MAC PDU assembly.

Alternative 2: Counter-Based

A specific counter ("BFR-SR counter") may be used to control the BFR-SR transmission. For example, the UE may use the BFR-SR counter to count how many times the BFR-SR has been transmitted. NW may configure UE with a maximum number for the BFR-SR counter. When the UE transmits the BFR-SR, the UE may increment the BFR-SR counter by '1'.

If the BFR-SR counter reaches the maximum number, the UE may perform one or more following actions:

Action 1. not transmit the BFR-SR.
Action 2. cancel the corresponding SR procedure (e.g., pending SR procedure).
Action 3. cancel the BFR procedure (for SCell).
Action 4. trigger another BFR procedure (e.g., for PCell).
Action 5. initiate an RA procedure (on the SpCell).
Action 6. notify RRC to release PUCCH (for the corresponding SCell(s) or for all Serving Cells).
Action 7. notify RRC to release SRS (for the corresponding SCell(s) or for all Serving Cells).
Action 8. clear configured DL assignment and/or UL grant (of the corresponding SCell(s) or for all Serving Cells).
Action 9. clear PUSCH resource for semi-persistent CSI reporting.
Action 10. deactivate the corresponding SCell(s). When the UE deactivates the corresponding SCell(s), the UE may send an indication (e.g., a MAC CE) to NW to inform condition.

In addition, the BFR-SR counter may be reset when one or more following conditions happen:

Condition 1. a reset of the MAC entity is requested by an upper layer.

Condition 2. the corresponding BFR-SR configuration is reconfigured.

Condition 3. any configuration of the BFR configuration (for SCell) is reconfigured (e.g., counter, timer).

Condition 4. the corresponding UL resource for BFR-SR, BFD RS and/or NBI RS is reconfigured.

Condition 5. the corresponding BFR procedure (for SCell) is completed.

Condition 6. the corresponding BWP is switched/deactivated.

Condition 7. the corresponding SCell(s) is deactivated.

Condition 8. a SR procedure is triggered and there is no other SR procedure pending.

Condition 9. a BFR procedure is triggered and there is no other triggered and uncancelled BFR procedure(s).

Condition 10. BFR-SR counter reaches the maximum number.

Condition 11. the BFR-SR timer is stopped or expires.

More specifically, the corresponding BWP may be an active UL and/or DL BWP. The corresponding BWP may be a BWP which is used to transmit the BFR-SR. The corresponding BWP may be a BWP that is used to transmit the BFR report. The corresponding BWP may be a BWP of a SpCell or SCell.

More specifically, the corresponding BWP may be switched/deactivated by PDCCH indicating a downlink assignment or a UL grant, by the bwp-InactivityTimer, by RRC signaling, or by the MAC entity itself upon initiation of RA procedure. The corresponding BWP for a Serving Cell is used to activate an inactive BWP and deactivate an active BWP at a time.

More specifically, the corresponding SCell(s) may be an activated SCell(s) that triggers the BFR procedure (for SCell). The corresponding SCell(s) may be an activated SCell(s) which is used to transmit the BFR-SR. The corresponding SCell(s) may be an SCell that is used to transit the BFR report.

More specifically, the corresponding SCell(s) may be deactivated by the NW (e.g., based on SCell activation/deactivation MAC CE) or by the UE itself (e.g., based on an SCell deactivation timer).

In some implementations, the ongoing RA procedure (on SpCell/SCell) or ongoing BFR procedure (on SpCell/SCell) triggered due to the expiration of BFR-SR counter/BFR-SR timer may be stopped/canceled if one or more following conditions is satisfied:

Condition 1: Transmission of a BFR MAC CE

In one example, the ongoing RA procedure (on SpCell/SCell) or BFR procedure (on SpCell/SCell) may be stopped upon transmission of a MAC PDU on a UL resource provided by dynamic grant/configured grant/RAR, and the MAC PDU includes a BFR MAC CE.

In one example, the ongoing RA procedure (on SpCell/SCell) or BFR procedure (on SpCell/SCell) may be stopped only if the BFR MAC CE includes all the SCells of a cell group that detects beam failure prior to the MAC PDU assembly.

Condition 2: UL Resource being Available for Transmission

In one example, the ongoing RA procedure (on SpCell/SCell) or BFR procedure (on SpCell/SCell) may be stopped by the MAC entity if a UL resource is available for transmission of a BFR MAC CE.

In one example, the BFR procedure(s) may be either cell-based or cell-group-based. The examples of a cell-based/cell-group based BFR procedure is disclosed.

In one example, the UL resource may be provided by a dynamic grant, a configured UL grant Type 1/Type 2, and/or UL grant in RAR.

In one example, the UL resource may be a resource dedicated to the transmission of a BFR MAC CE. In this case, NW may indicate, via DCI or RRC signaling, that the corresponding UL resource is for transmission of a BFR MAC CE.

In one example, the UL resource is available for transmission means the UL resource can accommodate the BFR MAC CE (with its subheader).

In one example, the UL resource is available for transmission means the UL resource may be used for BFR MAC CE based on some restrictions. More specifically, the BFR MAC CE could only be transmitted on a specific UL resource (e.g., the specific UL resource implicitly or explicitly indicates a specific information). If the received UL resource indicates the specific information, the UL resource may be allowed to be used for BFR MAC CE.

In one example, the UL resource(s) may be considered available if it is not allocated in a cell where beam failure has been detected and/or it is not allocated in a cell where SR procedure/BFR procedure has been triggered and not canceled.

Figure 5:
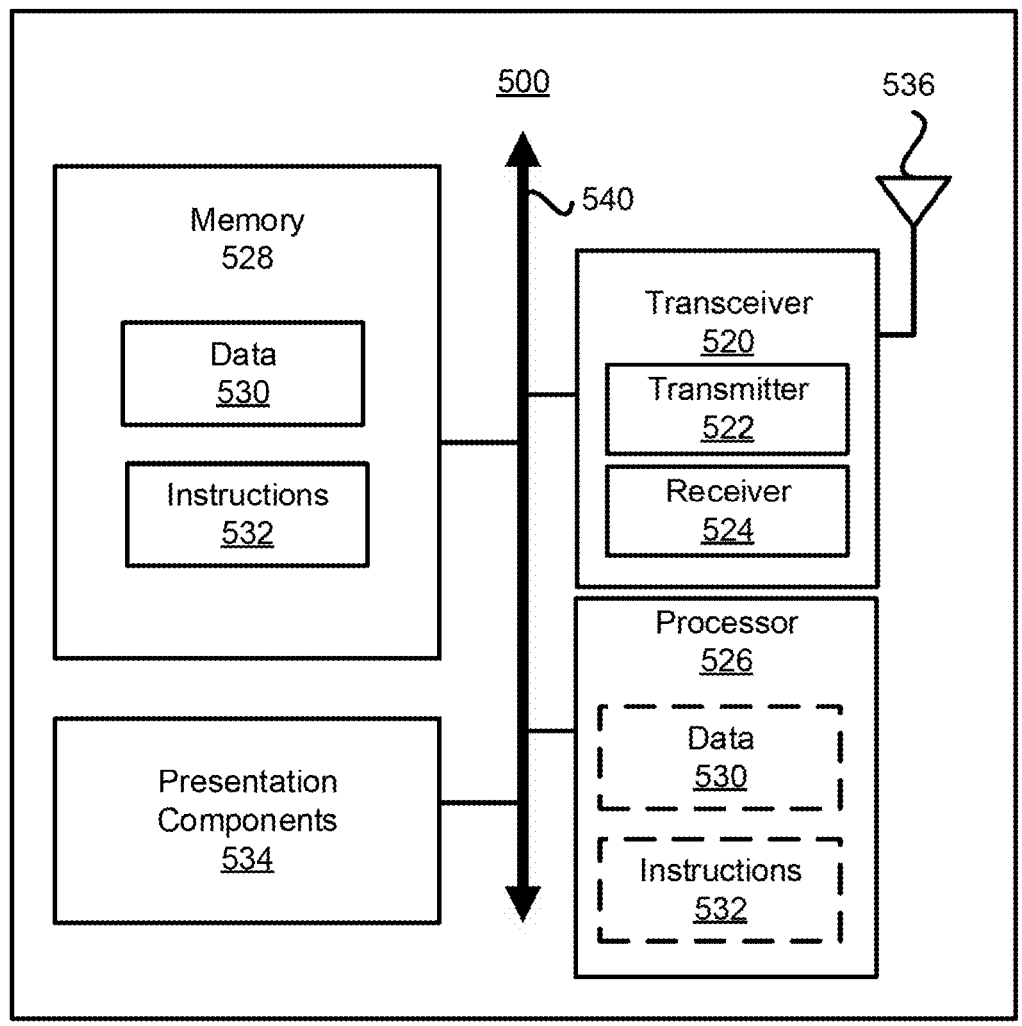
FIG. 5 is a block diagram illustrating a node for wireless communication, in accordance with example implementations of the present disclosure.

FIG. 5 illustrates a node 500 for wireless communication according to the present disclosure.

As illustrated in FIG. 5, the node 500 may include a transceiver 520, a processor 526, memory 528, one or more presentation components 534, and at least one antenna 536. The node 500 may also include a Radio Frequency (RF) spectrum band module, a BS communications module, a network communications module, and a system communications management module, input/output (I/O) ports, I/O components, and a power supply (not illustrated). Each of these components may be in communication with each other, directly or indirectly, over one or more buses 540. The node 500 may be a UE that performs various disclosed functions as illustrated in FIG. 1.

The transceiver 520 includes a transmitter 522 (with transmitting circuitry) and a receiver 524 (with receiving circuitry) and may be configured to transmit and/or receive time and/or frequency resource partitioning information. The transceiver 520 may be configured to transmit in different types of subframes and slots including, but not limited to, usable, non-usable and flexibly usable subframes and slot formats. The transceiver 520 may be configured to receive data and control channels.

The node 500 may include a variety of computer-readable media. Computer-readable media may be any media that can be accessed by the node 500 and include both volatile and non-volatile media, removable and non-removable media. Computer-readable media may include computer storage media and communication media. Computer storage media includes both volatile and non-volatile, as well as removable and non-removable media implemented in any method or technology for storage of information such as computer-readable instructions, data structures, program modules or other data.

Computer storage media includes RAM, ROM, EEPROM, flash memory or other memory technology, Compact Disc Read-Only Memory (CD-ROM), digital versatile disks (DVD) or other optical disk storage, magnetic cassettes, magnetic tape, magnetic disk storage or other magnetic storage devices. Computer storage media does not include a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Communication media includes wired media such as a wired network or direct-wired connection, and wireless media such as acoustic, radio frequency (RF), infrared and other wireless media. Combinations of any of the disclosed media should be included within the scope of computer-readable media.

The memory 528 may include computer-storage media in the form of volatile and/or non-volatile memory. The memory 528 may be removable, non-removable, or a combination thereof. Memory includes solid-state memory, hard drives, and optical-disc drives. As illustrated in FIG. 5, the memory 528 may store computer-readable, computer-executable instructions 532 (e.g., software codes) that are configured to cause the processor 526 (e.g., processing circuitry) to perform various disclosed functions. Alternatively, the instructions 532 may be configured to cause the node 500 (e.g., when compiled and executed) to perform various disclosed functions.

The processor 526 may include an intelligent hardware device (e.g., a central processing unit (CPU), a microcontroller, an Application Specific Integrated Circuit (ASIC), etc.). The processor 526 may include memory. The processor 526 may process the data 530 and the instructions 532 received from the memory 528, and information received via the transceiver 520, the baseband communications module, and/or the network communications module. The processor 526 may also process information to be sent to the transceiver 520 for transmission via the antenna 536, to the network communications module for transmission to a CN.

One or more presentation components 534 present data to a person or other device. Presentation components 534 include a display device, speaker, printing component, and vibrating component.

From the present disclosure, it is evident that various techniques can be utilized for implementing the concepts of the present disclosure without departing from the scope of those concepts. Moreover, while the concepts have been described with specific reference to certain implementations, a person of ordinary skill in the art would recognize that changes can be made in form and detail without departing from the scope of those concepts. As such, the disclosure is to be considered in all respects as illustrative and not restrictive. It should also be understood that the present disclosure is not limited to the particular described implementations, but that many rearrangements, modifications, and substitutions are possible without departing from the scope of the present disclosure.

What is claimed is:

1. A method for a user equipment (UE) for performing a beam failure recovery (BFR) procedure, the method comprising:
   performing a first beam failure detection (BFD) procedure on a first cell;
   performing a second BFD procedure on a second cell;
   triggering a first BFR procedure for the first cell in response to a beam failure being detected on the first cell by the first BFD procedure;
   triggering a second BFR procedure for the second cell in response to a beam failure being detected on the second cell by the second BFD procedure;
   transmitting a BFR report corresponding to at least one of the first and second BFR procedures successfully to a base station (BS);
   determining whether to cancel at least one of the triggered first BFR procedure and the triggered second BFR procedure based on whether the BFR report corresponding to the at least one of the first and second BFR procedures includes at least one of BFR information of the first cell and BFR information of the second cell; and
   canceling the triggered first BFR procedure for the first cell in response to the BFR report including the BFR information of the first cell.

2. The method of claim 1, further comprising:
   canceling the triggered second BFR procedure for the second cell in response to the BFR report including the BFR information of the second cell.

3. The method of claim 1, further comprising:
   determining the BFR report is successfully transmitted to the BS when a BFR response corresponding to the transmitted BFR report is received from the BS; and
   determining the first BFR procedure is completed when the BFR response is received from the BS.

4. The method of claim 1, further comprising:
   canceling the triggered first BFR procedure for the first cell further in response to the first cell being deactivated; and
   canceling the triggered second BFR procedure for the second cell in response to the second cell being deactivated.

5. The method of claim 4, further comprising:
   canceling the triggered first BFR procedure for the first cell in response to one of a first deactivation timer associated with the first cell expiring and a first deactivation command for deactivating the first cell being received from the BS; and
   canceling the triggered second BFR procedure for the second cell in response to one of a second deactivation timer associated with the second cell being deactivated and a second deactivation command for deactivating the second cell being received from the BS.

6. The method of claim 1, further comprising:
   determining whether an uplink (UL) resource is available for transmitting the BFR report;
   triggering a first scheduling request (SR) procedure for the first cell and triggering a second SR procedure for the second cell when the UL resource is determined to be not available for transmitting the BFR report;
   after the UL resource is available and the BFR report is transmitted on the UL resource, determining whether to cancel at least one of the triggered first SR procedure and the triggered second SR procedure based on whether the BFR report being transmitted includes at least one of the BFR information of the first cell and the BFR information of the second cell;
   canceling the triggered first SR procedure for the first cell in response to the BFR report including the BFR information of the first cell being successfully transmitted; and
   canceling the triggered second SR procedure for the second cell in response to the BFR report further including the BFR information of the second cell being successfully transmitted.

7. The method of claim 1, wherein the BFR information of the first cell includes both a cell identity of the first cell and a measured candidate beam of the first cell.

8. The method of claim 1, wherein the BFR information of the second cell includes both a cell identity of the second cell and a measured candidate beam of the second cell.

9. The method of claim 1, further comprising:
setting a first number of detected beam failure events on the first cell in the first BFD procedure to a first initial value in response to the first cell being deactivated; and
setting a second number of detected beam failure events on the second cell in the second BFD procedure to a second initial value in response to the second cell being deactivated.

10. A user equipment (UE) for performing a beam failure recovery (BFR) procedure, the UE comprising:
a processor for executing computer-executable instructions; and
a non-transitory machine-readable medium, coupled to the processor, for storing the computer-executable instructions, wherein the computer-executable instructions, when executed by the processor, instruct the processor to:
perform a first beam failure detection (BFD) procedure on a first cell;
perform a second BFD procedure on a second cell;
trigger a first BFR procedure for the first cell in response to a beam failure being detected on the first cell by the first BFD procedure;
trigger a second BFR procedure for the second cell in response to a beam failure being detected on the second cell by the second BFD procedure;
transmit a BFR report corresponding to at least one of the first and second BFR procedures successfully to a base station (BS);
determine whether to cancel at least one of the triggered first BFR procedure and the triggered second BFR procedure based on whether the BFR report corresponding to the at least one of the first and second BFR procedures includes at least one of BFR information of the first cell and BFR information of the second cell; and
cancel the triggered first BFR procedure for the first cell in response to the BFR report including the BFR information of the first cell.

11. The UE of claim 10, wherein the computer-executable instructions further instruct the processor to:
cancel the triggered second BFR procedure for the second cell in response to the BFR report including the BFR information of the second cell.

12. The UE of claim 10, wherein the computer-executable instructions further instruct the processor to:
determine the BFR report is successfully transmitted to the BS when a BFR response corresponding to the transmitted BFR report is received from the BS; and
determining the first BFR procedure is completed when the BFR response is received from the BS.

13. The UE of claim 10, wherein the computer-executable instructions further instruct the processor to:
cancel the triggered first BFR procedure for the first cell further in response to the first cell being deactivated; and
cancel the triggered second BFR procedure for the second cell in response to the second cell being deactivated.

14. The UE of claim 13, wherein the computer-executable instructions further instruct the processor to:
cancel the triggered first BFR procedure for the first cell in response to one of a first deactivation timer associated with the first cell expiring and a first deactivation command for deactivating the first cell being received from the BS; and
cancel the triggered second BFR procedure for the second cell in response to one of a second deactivation timer associated with the second cell being deactivated and a second deactivation command for deactivating the second cell being received from the BS.

15. The UE of claim 10, wherein the computer-executable instructions further instruct the processor to:
determine whether an uplink (UL) resource is available for transmitting the BFR report;
trigger a first scheduling request (SR) procedure for the first cell and triggering a second SR procedure for the second cell when the UL resource is determined to be not available for transmitting the BFR report;
after the UL resource is available and the BFR report is transmitted on the UL resource, determine whether to cancel at least one of the triggered first SR procedure and the triggered second SR procedure based on whether the BFR report being transmitted includes at least one of the BFR information of the first cell and the BFR information of the second cell;
cancel the triggered first SR procedure for the first cell in response to the BFR report including the BFR information of the first cell being successfully transmitted; and
cancel the triggered second SR procedure for the second cell in response to the BFR report further including the BFR information of the second cell being successfully transmitted.

16. The UE of claim 10, wherein the BFR information of the first cell includes both a cell identity of the first cell and a measured candidate beam of the first cell.

17. The UE of claim 10, wherein the BFR information of the second cell includes both a cell identity of the second cell and a measured candidate beam of the second cell.

18. The UE of claim 10, wherein the computer-executable instructions further instruct the processor to:
set a first number of detected beam failure events on the first cell in the first BFD procedure to a first initial value in response to the first cell being deactivated; and
set a second number of detected beam failure events on the second cell in the second BFD procedure to a second initial value in response to the second cell being deactivated.

19. The method of claim 6, further comprising:
canceling the triggered first SR procedure for the first cell in response to the first cell being deactivated; and
canceling the triggered second SR procedure for the second cell in response to the second cell being deactivated.

20. The UE of claim 15, wherein the computer-executable instructions further instruct the processor to:
cancel the triggered first SR procedure for the first cell further in response to the first cell being deactivated; and
cancel the triggered second SR procedure for the second cell further in response to the second cell being deactivated.

* * * * *